US008630586B2

(12) United States Patent
Dvortsov et al.

(10) Patent No.: US 8,630,586 B2
(45) Date of Patent: Jan. 14, 2014

(54) INTELLIGENT PAIRING OF ELECTRONIC DEVICES

(75) Inventors: Eugene Dvortsov, San Francisco, CA (US); Benjamin A. Rottler, San Francisco, CA (US); Michael I. Ingrassia, Jr., San Jose, CA (US)

(73) Assignee: Apple Inc., Cupertino, CA (US)

( * ) Notice: Subject to any disclaimer, the term of this patent is extended or adjusted under 35 U.S.C. 154(b) by 412 days.

(21) Appl. No.: 12/872,481

(22) Filed: Aug. 31, 2010

(65) Prior Publication Data

US 2012/0050153 A1    Mar. 1, 2012

(51) Int. Cl.
*H04B 7/00*    (2006.01)

(52) U.S. Cl.
USPC ...................................... 455/41.2; 455/550.1

(58) Field of Classification Search
USPC ................ 455/41.1, 41.2, 41.3, 550.1, 556.2; 702/141
See application file for complete search history.

(56) References Cited

U.S. PATENT DOCUMENTS

| 7,130,584 | B2 | 10/2006 | Hirvonen |
| 2005/0174975 | A1 | 8/2005 | Mgrdechian et al. |
| 2005/0266798 | A1* | 12/2005 | Moloney et al. ............. 455/41.2 |
| 2007/0003061 | A1 | 1/2007 | Jung et al. |
| 2007/0075965 | A1 | 4/2007 | Huppi et al. |
| 2007/0129907 | A1* | 6/2007 | Demon ......................... 702/127 |
| 2007/0141989 | A1 | 6/2007 | Flinchem |
| 2007/0162569 | A1 | 7/2007 | Robinson et al. |
| 2007/0188323 | A1 | 8/2007 | Sinclair et al. |
| 2007/0197164 | A1 | 8/2007 | Sheynman et al. |
| 2008/0006762 | A1 | 1/2008 | Fadell et al. |
| 2008/0227393 | A1 | 9/2008 | Tang et al. |
| 2008/0287062 | A1* | 11/2008 | Claus et al. ................. 455/41.2 |
| 2009/0061769 | A1 | 3/2009 | Zimbric et al. |
| 2009/0111378 | A1 | 4/2009 | Sheynman et al. |
| 2009/0227282 | A1 | 9/2009 | Miyabayashi et al. |
| 2010/0099539 | A1* | 4/2010 | Haataja ............................ 482/8 |
| 2010/0278345 | A1 | 11/2010 | Alsina et al. |

FOREIGN PATENT DOCUMENTS

| EP | 1324550 A2 | 7/2003 |
| EP | 1569411 A1 | 8/2005 |
| EP | 1755060 A1 | 2/2007 |
| WO | WO 2004/003801 A1 | 1/2004 |

OTHER PUBLICATIONS

Castelluccia et al. (Shake them up!: a movement-based pairing protocol for CPU-constrained devices, MobiSys '05 Proceedings of the 3rd international conference on Mobile systems), 2005.
Gartell, C.M. "SocialAware: Context-Aware Multimedia Presentation via Mobile Social Networks," 2008, retrieved from the internet: http://www.cs.colorado.edu/{rhan/Papers/Mike_Gartell_CU_MS-thesis-final.pdf, retrieved on Sep. 16, 2010, XP002601028.

(Continued)

*Primary Examiner* — Ping Hsieh
(74) *Attorney, Agent, or Firm* — Park, Vaughan, Fleming & Dowler LLP

(57) ABSTRACT

An intelligent pairing between a first device and a target second device is described. The intelligent pairing can use information provided by a plurality of second devices responding to a connection request by the first device where only one of the plurality of responding second devices is the target second device. The information can include a motion signature, a first device identifier, and a second device identifier.

19 Claims, 24 Drawing Sheets

(56) References Cited

OTHER PUBLICATIONS

Mayrhofer, R. et al., "Shake Well Before Use: Intuitive and Secure Pairing of Mobile Devices," Feb. 18, 2009, IEEE Transactions on Mobile Computing, IEEE Service Center, Los Alamitos, CA, US pp. 792-806, XP011252694.

Eagle, N. et al., Social Serendipity: Proximity Sensing and Cueing, Internet Citation, May 31, 2004, retrieved from internet: http://www-static.cc.gatech.edu/gvu/ccg//paper_of_week/socialserendipity.pdf, retrieved Jul. 25, 2006, XP002392394.

Beach, A. et al., "WhozThat? Evolving an ecosystem for context-aware mobile social networks," IEEE Network, IEEE Service Center, New York, NY, US, LNKD-DOI: 10.1109/MNET.2008.4579771, vol. 22, No. 4, Jul. 1, 2008, pp. 50-55, XP011232028.

Homquist, L. et al., "Smart-Its Friends: A Technique for Users to Easily Establish Connections Between Smart Artefacts," Sep. 1, 2001, retrieved from Internet: http://www.smart-its.org/publication/smart-its-friends.ubicomp2001.pdf. retrieved Sep. 1, 2001, XP009052293.

International Search Report mailed Oct. 26, 2010, for International Application No. PCT/US2010/032115, 25 pages.

International Preliminary Report on Patentability mailed Nov. 17, 2011, for International Application No. PCT/US2010/032115, 15 pages.

PCT International Preliminary Report on Patentability mailed Nov. 17, 2011 for PCT/US2010/032115 filed Apr. 22, 2010.

http://web.archive.org/web/20090422160554/http://www.bumptechnologies.com/faq.phtml Apr. 22, 2009.

Darko Kirovski, Michael Sinclair, and David Wilson, "The Martini Synch: Using Accelerometers for Device Pairing", http://research.microsoft.com/en-us/um/people/darkok/papers/martini22.pdf, Microsoft Research, pp. 1-16.

Darko Systems, The Martini Synch, http://research.microsoft.com/en-us/um/people/darkok/projectssysmar.htm, Apr. 13, 2009, 2 pgs.

Bump Technologies, "Bump™ for Iphone and iPod Touch", http://www.bumptechnologies.com/products.phtml, 2009 Bump Technologies LLC.

\* cited by examiner

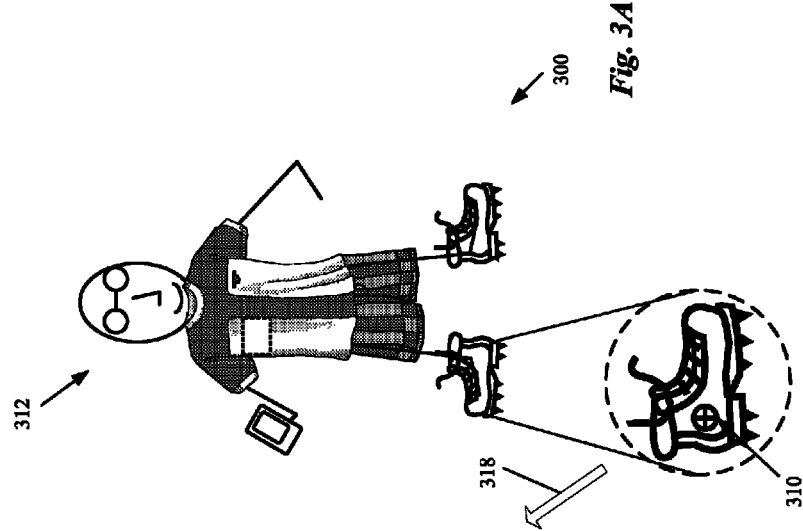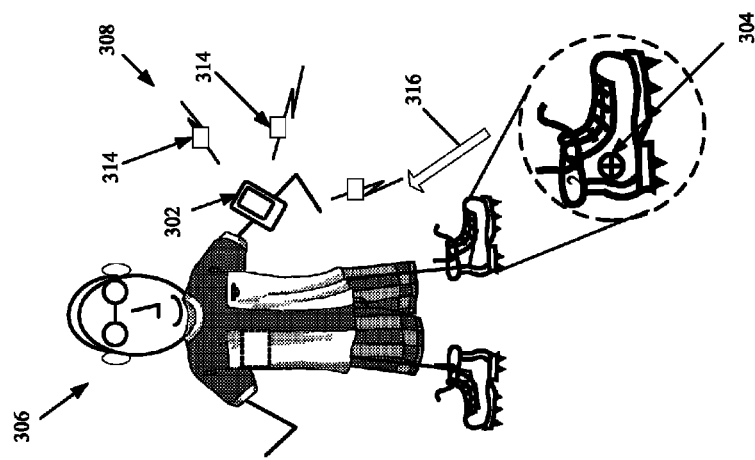

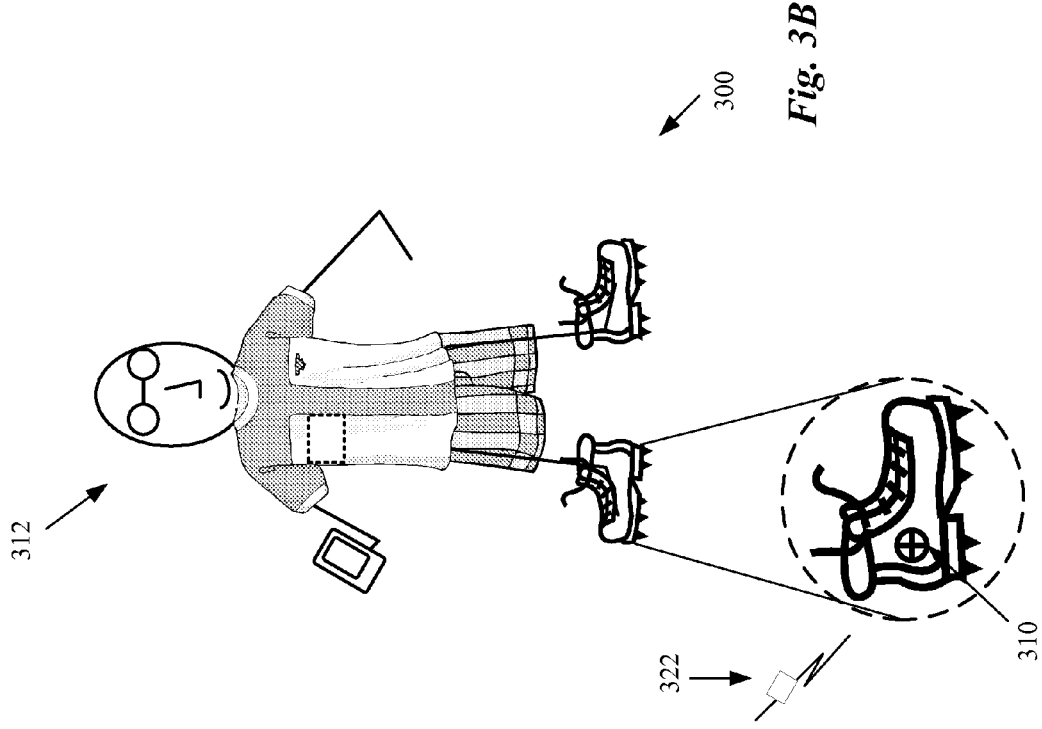
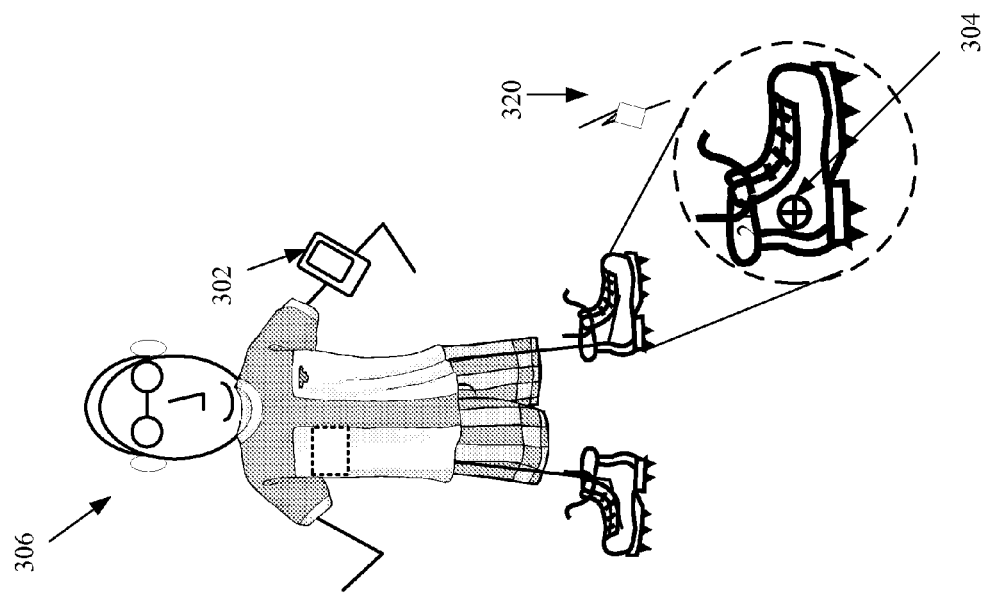
Fig. 3B

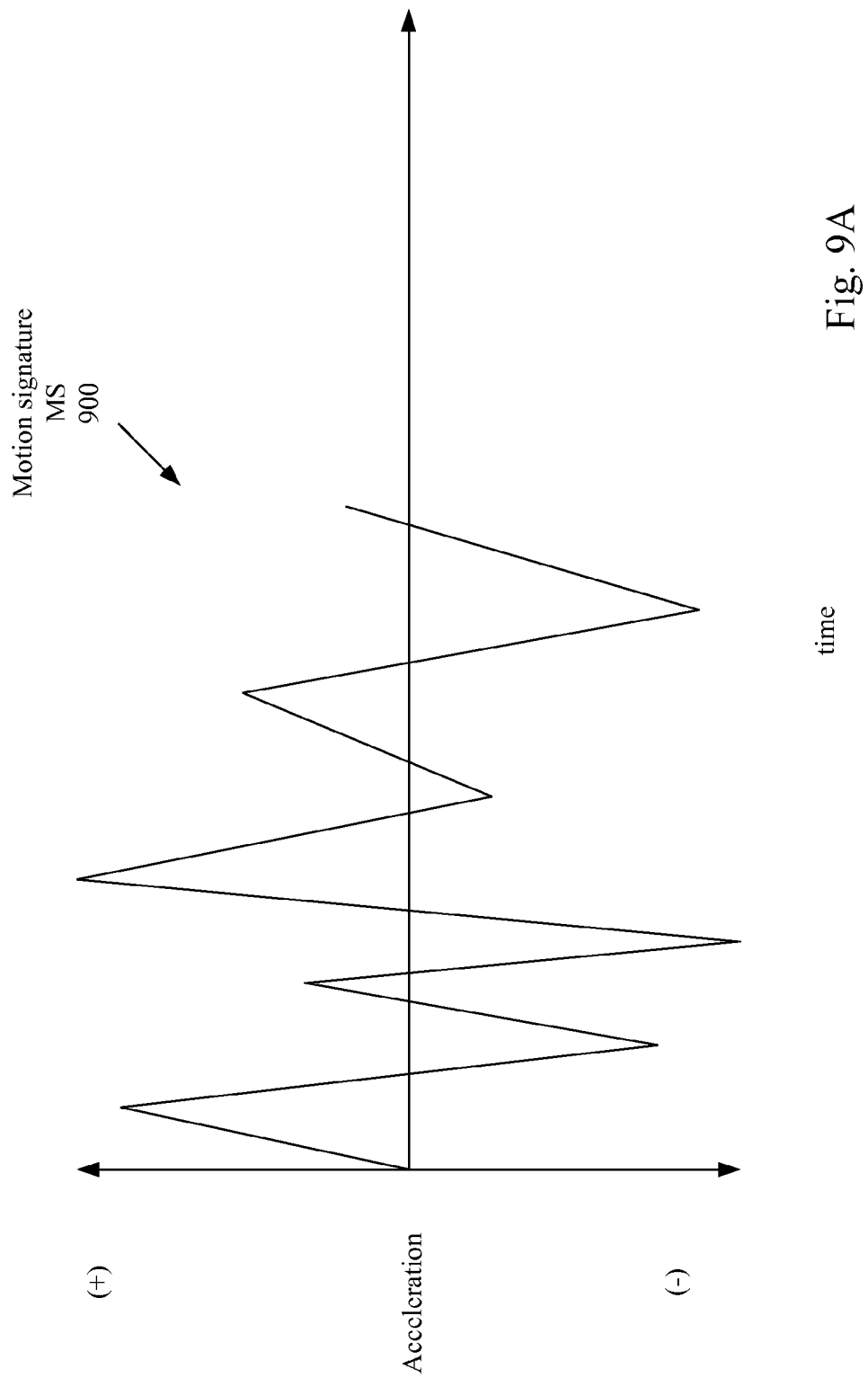

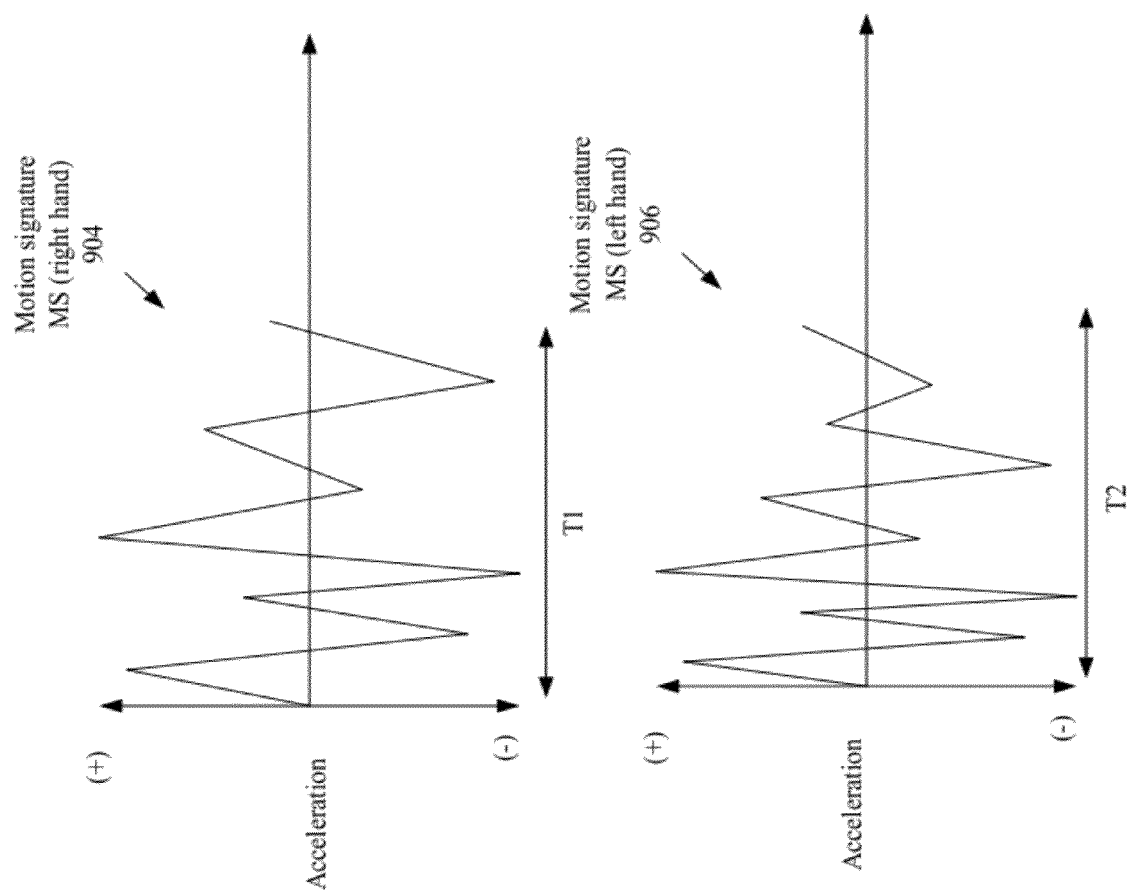

INTELLIGENT PAIRING OF ELECTRONIC DEVICES

TECHNICAL FIELD

The embodiments described herein relate generally to the field of small form factor electronic devices. More particularly, the embodiments describe techniques for intelligently pairing a portable device and a remote device.

BACKGROUND

While most people appreciate the importance of physical fitness, many have difficulty finding the motivation required to maintain a regular exercise program. Some people find it particularly difficult to maintain an exercise regimen that involves continuously repetitive motions, such as running, walking and bicycling. Experienced athletes and trainers have found that feedback provides many people with motivation to maintain a regular exercise program. When a person can directly experience the results provided by an exercise program, that person typically will be encouraged to continue exercising. Recently the use of athletic information monitoring devices as represented by the Nike-iPod™ system has become commonplace. Typically, an athletic information monitoring device will incorporate a sensor for measuring parameters relating to the person being monitored and a portable computing device attached to or carried by the person for processing the parameters measured by the remote device. In many cases the sensor and computing device share a wireless communication channel used for passing information between the remote device and the computing device. In order to establish the wireless communication channel a handshaking process (also referred to as pairing) is performed. The pairing process is typically triggered automatically the first time a remote device wirelessly receives a connection request from the computing device with which it is not yet paired.

Many experienced athletes and trainers also have found that competition may provide an even stronger motivation to maintain a regular exercise program. Some athletes, for example, will be more motivated to exercise when competing against a partner than by exercising alone. These athletes may, for example, exercise with a partner, enter into athletic contests such as races, or even just compare their current performance ability with a friend's. Unfortunately, in those situations where more than one remote device is within wireless range of the computing device, the connection request sent by the computing device can be received by more than the target remote device each of which can respond resulting in pairing with a remote device that is not the target remote device.

Therefore, system, method, and apparatus for intelligently pairing wireless devices are desirable.

SUMMARY OF THE DESCRIBED EMBODIMENTS

A method for establishing a wireless link between a first and a second device can be performed by sharing information between the first device and the second device, wirelessly linking the first and the second devices using at least some of the shared information and re-establishing the wireless link between only the first and the second devices using at least some of the shared information at a subsequent pairing operation.

In one aspect of the described embodiment, the shared information can take the form of a motion signature. The motion signature being motion data generated by at least a motion detector in response to movements applied to both the first and second devices. In yet another embodiment the first device is a personal media device (PMD) and the second device is a sport device (SD). The shared information is at least one of the following: a list that includes at least one preferred personal media device identifier (PMD_ID), an input command pattern, information related to current proximity of the first device and the second device, a list that includes at least one PMD_ID corresponding the PMD recently paired with a target SD, a preferred PMD_ID, and a preferred sport device identifier (SD_ID).

A portable media device includes at least a processor and a memory device coupled to the processor. The portable media device wirelessly pairs with a target remote device using a wireless interface to receive information from each of a plurality of remote devices only one of which is the target remote device. The portable media device analyzes the received information and based on the analysis, identifies the target remote device and pairs with the identified remote device.

In one aspect, the portable media device is wireless capable having the wireless interface is incorporated into the portable media device.

In yet another aspect, the portable media device is not wireless capable and the wireless interface is part of an external circuit electrically connected to the portable media device.

Non-transitory computer readable medium for storing computer code executed by a processor in a portable device for pairing with a target remote device is described. The computer readable medium includes at least computer code for sharing information between a first device and a second device during an initial pairing operation, computer code for wirelessly linking the first and the second devices using at least some of the shared information, and computer code for after the wireless link has been severed, re-establishing the wireless link between only the first and the second devices using at least some of the shared information at a subsequent pairing operation.

A method performed by a personal media device (PMD) to intelligently pair with only a target remote device is described. The intelligent pairing can be carried out by the PMD listening for connection packets from a plurality of remote devices only one of which is the target remote device. In the described embodiment, each of the connection packets includes information. The PMD analyzes the information in the received connection packets to identify the target remote device. Based on the analysis of the information, the PMD pairs only with the target remote device.

A physical activity monitoring system includes at least a portable media device, the portable media device arranged to wirelessly communicate with a first remote physical activity device over an initial wireless link in response to an initial pairing operation, wherein subsequent to the initial pairing and after the initial wireless link has been severed, the portable media device re-establishes a subsequent wireless link only with the first remote physical activity device by broadcasting a request for information, operating on information received in response to the broadcasted information request, the information being received from a plurality of remote physical activity devices only one of which is the initial remote physical activity device, and using the operated on information to broadcast a connection acceptance command that only the first remote physical activity device responds with a connection acknowledgment.

Other apparatuses, methods, features and advantages of the described embodiments will be or will become apparent to one with skill in the art upon examination of the following figures and detailed description. It is target that all such additional apparatuses, methods, features and advantages be included within this description be within the scope of and protected by the accompanying claims.

BRIEF DESCRIPTION OF THE DRAWINGS

The described embodiments and the advantages thereof can best be understood by reference to the following description taken in conjunction with the accompanying drawings.

FIGS. 3A and 3B illustrates a portable media device (PMD) electronically pairing with only one of a plurality of remote devices as a target remote device.

FIG. 9A shows a representative motion signature in accordance with the described embodiments.

FIG. 9B shows representative motion signatures and associated time stamps in accordance with the described embodiments.

FIGS. 11-20 show flowcharts describing processes for intelligently pairing between a host and second device in accordance with described embodiments.

DETAILED DESCRIPTION OF REPRESENTATIVE EMBODIMENTS

Figure 1:
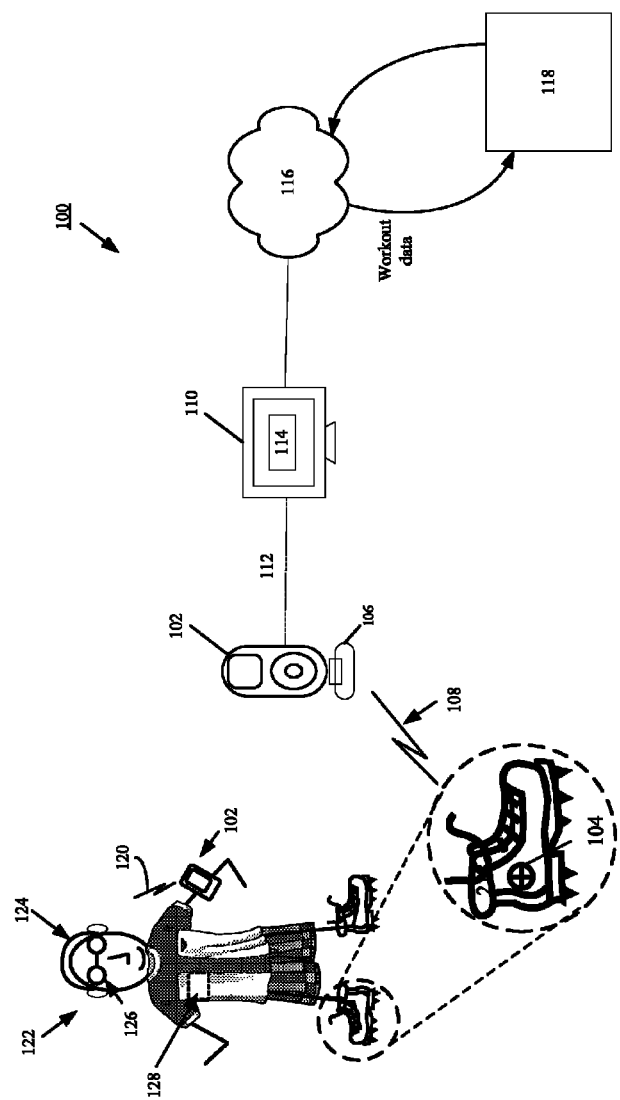
FIG. 1 is a block diagram of sports monitoring system according to one embodiment.

In the following detailed description, numerous specific details are set forth to provide a thorough understanding of the concepts underlying the described embodiments. It will be apparent, however, to one skilled in the art that the described embodiments can be practiced without some or all of these specific details. In other instances, well known process steps have not been described in detail in order to avoid unnecessarily obscuring the underlying concepts.

Aspects of the described embodiments relate to the measurement, collection and display of athletic information. As will be appreciated by those of ordinary skill in the art, athletic information must first be obtained from an individual person. One or more different athletic information monitoring devices can be used to measure and record athletic data corresponding to athletic activity performed by a person. Typically, an athletic information monitoring device will incorporate a sensor incorporated into a remote device for measuring parameters relating to the person being monitored, and a computing device for processing the parameters measured by the sensor the parameters measured by the sensor can include parameters related to physical activity such as running or jogging. The parameters can also include physiologic data such as calories burned, oxygen intake, body temperature, breathing rate, heart rate, and so forth. In some cases, the sensor can include positioning functionality (such as GPS) related to the geographic location of the sensor The embodiments described relate to improved techniques and systems for utilizing a multi-functional portable device (MFD) to monitor, process, present and manage data captured by a remote device. The MFD can pertain to a portable media device such as an iPod™, a personal communication device along the lines of the iPhone™, or portable computing platform such as a tablet computer that includes the iPad™, all of which are manufactured by Apple Inc. of Cupertino, Calif.

More specifically, intelligent pairing between the MFD and the remote device is described. Intelligent pairing between the MFD and the remote device is particularly important in those situations where more than one remote device is eligible to pair with the MFD.

Intelligent pairing between a requesting MFD and one of at least two remote devices only one of which is a target remote device is described. In one embodiment, the intelligent pairing can be carried out by at least obtaining information by the requesting MFD from each of the at least two remote devices. The information can be part of a wireless transmission broadcast by each of the remote devices. The information can include an indication of the identity of the MFDs that have recently electronically paired with the remote devices. The indication of the identity of the requesting MFD can take the form of a MFD identifier (MFD_ID) associated with a particular MFD. Only those remote devices having recently electronically paired with the requesting MFD are eligible to electronically pair with the requesting MFD. In those situations where more than one of the remote devices has recently electronically paired with the requesting MFD, the target remote device is identified as the remote device that most recently electronically paired with the requesting MFD.

In an alternative implementation, each remote device is associated with a unique remote device identifier (RS_ID). In this case, the requesting MFD can electronically pair with only the remote device associated with a particular remote device identifier RS_ID, also referred to as a preferred remote device.

In another embodiment, a remote device can include a list of preferred MFDs. The list can take the form of the MFD_IDs of the preferred MFD. The remote device can electronically pair with only those MFDs identified as being preferred.

In yet another embodiment, the remote device and the MFD can each include a motion detector arranged to detect movement. The remote device and the MFD can store motion data corresponding to their respective movements. The MFD can obtain motion data from the remote device and compare the remote device motion data and the MFD motion data. The MFD can determine whether or not to electronically pair with the remote device based upon the comparison of the respective motion data. For example, the MFD can electronically pair with the remote device when the comparison indicates a high degree of correlation between current motion of the MFD and the current motion of the remote device.

In another embodiment, information can be shared between the MFD and the remote device during an initial electronic pairing. The shared information can be used after the initial electronic pairing has been severed to re-establish the electronic pairing of the MFD and the remote device at a subsequent electronic pairing. For example, the MFD and the remote device can be mechanically coupled in such a way that they each experience essentially the same movements during the initial electronic pairing. The movements can be stored in both the MFD and the remote device as the shared information in the form of motion data. The shared motion data can take the form of a motion signature. The motion signature can be used to uniquely associate the MFD and the remote device. The motion signature can be used by the MFD to electronically pair only with the remote device associated with the motion signature in order to re-establish the electronic pairing between the MFD and the remote device.

It should be noted that in some implementations the MFD and the remote device can be unpaired by causing the MFD and the remote device to undergo specific motions. The specific motions can cause a processor in the MFD to initiate an unpairing process. For example, during the unpairing process, the processor can sever the wireless link between the MFD and the remote device. Once the wireless link is severed, the processor can ensure that the wireless link is not re-established with the remote device by removing or otherwise rendering any shared information that was used to pair the MFD and remote device unavailable for a subsequent pairing operation. For example, when the MFD and remote device were paired using motion detection, the unpairing process can include erasing, or otherwise preventing access of, any motion data retained in the MFD or the remote device. In this way any attempt to re-pair the MFD and remote device using motion data will be futile. This functionality is advantageous in the event that a MFD is unintentionally paired with a remote device. The user can unpair with the remote device and ensure that the unintentional pairing does not occur again. An example of an unintentional pairing can included the instance in which a user's MFD pairs with a remote device other than the target remote device (e.g., pairs with a Nike sensor in a running shoe other than their own running shoe).

In an alternative implementation, the shared information can take the form of a defined set of input commands at the MFD. The defined set of input commands can then constitute a pairing identifier. The pairing identifier can be stored in the MFD and can be used in a subsequent electronic pairing to ensure that the MFD electronically pairs with a target remote device. For example, the set of input commands can include a pattern of presses at a power button on the MFD. The pattern can be based upon a number of times that the MFD is powered ON and a number of times that the MFD is powered OFF. In addition, a time interval between changes in the power state of the MFD can be considered as part of the pattern. Accordingly, in order for the MFD to successfully electronically pair with a remote device, an equivalent pattern must be forwarded by the remote device to the MFD which then must determine whether or not the received pattern is a match. In those cases where the received pattern is determined to be a match does the electronic pairing between the MFD and the remote device proceed to completion?

In yet another embodiment, the MFD can electronically pair with a remote device that is closest in proximity to the MFD. The MFD can determine the remote device in closest proximity based upon, for example, a comparison of relative wireless signal strength of wireless signals received from at least two sensors detected to be in proximity to the MFD. The one of the at least two remote devices having the relatively strongest wireless signal strength is considered to be the target remote device.

These and other embodiments are discussed below with reference to FIGS. 1-21. However, those skilled in the art will readily appreciate that the detailed description given herein with respect to these figures is for explanatory purposes only and should not be construed as limiting.

FIG. 1 is a representation of sports monitoring system 100 according to one embodiment. Sports monitoring system 100 can be an electronic system that enables sports related information to be acquired, stored, analyzed, presented and shared. Sports monitoring system 100 can include multi-functional portable device 102. For the remainder of this discussion and without loss of generality, multi-functional portable device 102 will be discussed in terms of a portable media device. Accordingly, portable media device 102 can store and play selected media items. Sports monitoring system 100 can include sports device 104 that can take the form of, for example, a pedometer, a heart rate monitor, and so on. Sports device 104 can be placed in a garment such as a shoe, shirt and so on. Sports device 104 can include one or more sensors that acquire sports related data including physiological data of the user. Sports device 104 can also include wireless transmission capability so that the sports related data can be wirelessly transmitted to portable media device 102. In order to wirelessly communicate with sports device 104, portable media device 102 can include wireless circuitry. In some embodiments, the wireless circuitry can take the form of an internal component contained within portable media device 102. The internal component can operate to transmit and receive radio frequency (RF) energy according to any of a number of wireless communication protocols such as WiFi™, BlueTooth™, GSM, CDMA, and so forth. In those situations, however, where portable media device 102 does not include internal wireless circuitry or wireless circuitry incapable of wireless communication with sports device 104, portable media device 102 can be electrically connected with wireless interface accessory 106 that can include a wireless transceiver. In this way, wireless interface accessory 106 can receive the sports related data transmitted by sports device 104 by way of a wireless connection through personal wireless network 108. Portable media device 102 can, in turn, receive the sports related data from sports device 104 via the wireless interface accessory 106. Once received, portable media device 102 can process and store the sports related data.

Sports monitoring system 100 can also include computing device 110. Portable media device 102 can be electrically connected to computing device 110 by way of communication link 112. Communication link 112 can be a wireless link based on a wireless communication protocol (such as Blue-Tooth™, WiFi™, and so on). Communication link 112 can be a wired link in the form of a wire or cable such as a FireWire or USB cable. In any case, information can be exchanged between portable media device 102 and computing device 110 over communication link 112. Computing device 110 can include media management application 114. Media management application 114 can manage media assets stored on computing device 110 and can store and manage sports related data. As an example, media management application 114 can take the form of iTunes® software application provided by Apple Inc. of Cupertino, Calif. Media management application 114 can operate to cause the sports related data stored on portable media device 102 to be copied to computing device 110. Thereafter, the sports related data can be analyzed at computing device 110. In addition, sports monitoring system 100 can facilitate computing device 110 coupling to data network 116. Data network 116 can represent a global or Wide Area network, such as the World Wide Web (or the Internet). When computing device 110 is coupled to data network 116, the sports related data present at computing device 110 can be transferred to sports management server 118 where the sports related data can be further analyzed and/or processed to facilitate usefulness of the data. Sports management server 118 can support storage and analysis of sports related data from a large number of different portable media devices and/or computing devices such as personal computers, laptop computers, tablet computers, and so on. Hence, sports management server 118 can also compare the sports related data from different users. In some cases, sports management server 118 can provide a website that can be accessed by a network browser operating on computing device 110 or other computing device to access sports related information or other information made available via the website.

Physiological data can be accumulated by sensor 104 and provided wirelessly to portable media device 102. Portable media device 102 can use the physiological data from sensor 104 to provide signals that can provide guidance to the user during the current exercise session. The guidance can be related to improving performance such as speed and agility or maintaining a monitored heart rate and/or breathing rate within a pre-set range. The signals can be sent from portable media device 102 to interface 122. Interface 122 can be widely varied and include any number and type of component interfaces. For example, interface 122 can include an audio interface, a video interface, and a tactile interface each of which can provide information singly or in any combination with each other. For example the audio interface can provide audio information by way of headphones 124 whereas the video interface can provide video information by way of video goggles 126. Tactile (i.e., touch) information can be provided by tactile unit 128 in addition to or in place of audio and video information. In some situations, it may be preferable to receive only tactile information from tactile unit 128. For example, when power supplied to portable media device 102 is limited, then a low power condition can preference the use of a low power haptic unit 128 to relay information over higher power consuming options such as video and/or audio.

Figure 2:
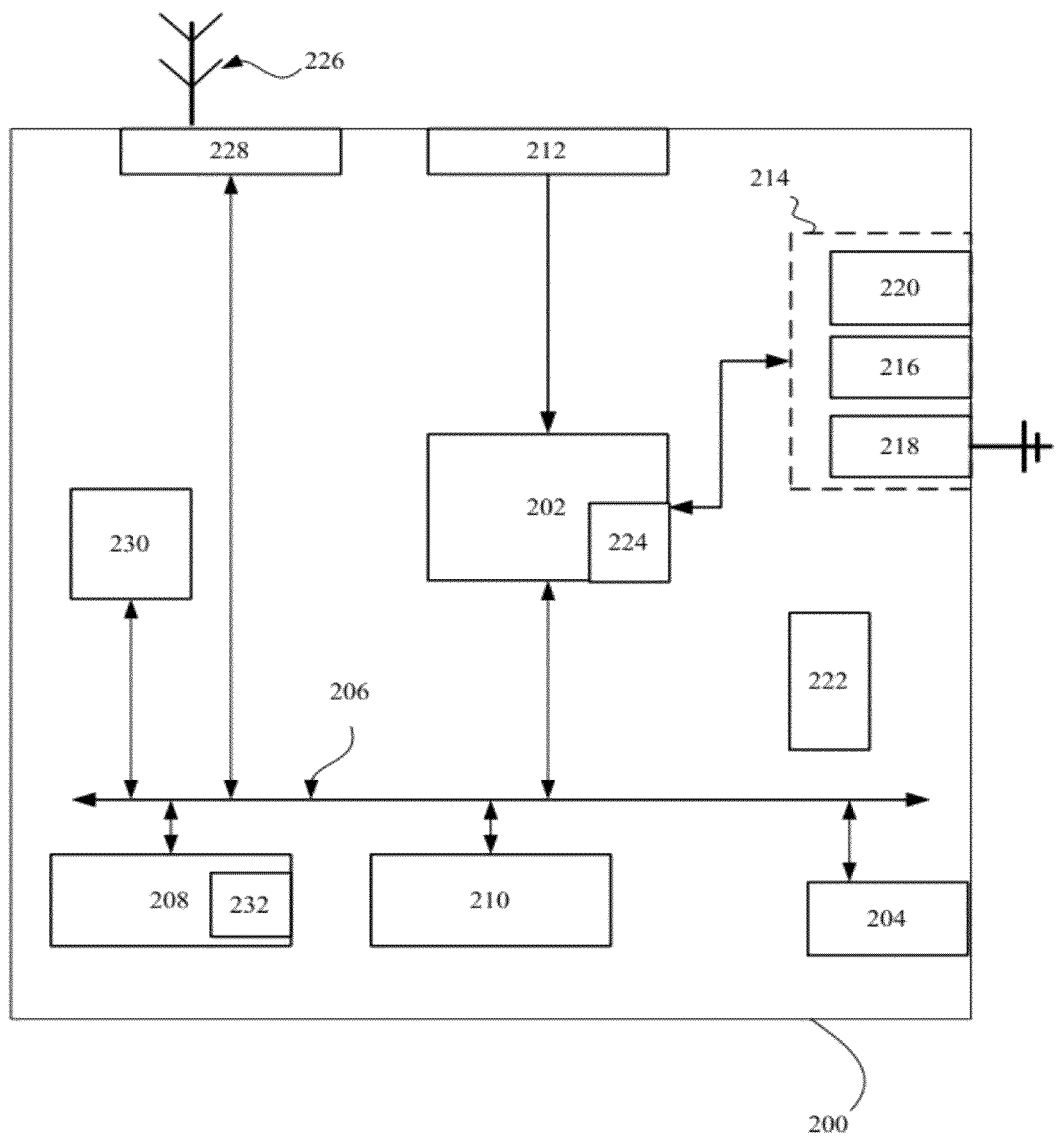
FIG. 2 illustrates a block diagram of an embodiment of sports device shown in FIG. 1.

FIG. 2 illustrates a block diagram of sports device 104 shown in FIG. 1 in the form of sports device 200. Sports device 200 can include microcontroller 202 that can control the overall operation of sports device 200. Sports device 200 also includes transducer 204 that acquires raw sports data. As an example, transducer 204 can pertain to a piezo-electric device (e.g., piezo-electric pedometer). With a piezo-electric device, electrical signals associated with pressure applied to transducer 204 are produced as a user of sports device 200 walks or runs. In one embodiment, sports device 200 can be embedded within a shoe, such as within a sole of a shoe. A signal conditioning circuit (not shown) can filter and/or amplify the raw sports data supplied by transducer 204. The resulting conditioned sports data can then be supplied to microcontroller 202 by way of data bus 206. Sports device 200 can include various memory devices arranged to store data such as the conditioned sports data. For example, data can be stored in RAM 208 that can provide volatile data storage and Read-Only Memory (ROM) 210 for storing programs, utilities or other processes to be executed. Sports device 200 can also include user input device 212 that allows a user to interact with sports device 200. For example, user input device 212 can take a variety of forms, such as a button, keypad, dial, touchpad, and so on having indicia to enable a user to know how to request an operation of sports device 200. User input device may be receive input mechanically or electrically. In addition, input may be received in the form of an audio signal, magnetic signal, a touch input signal, and motion input signal, video signal, light input, and the like. In one embodiment, the indicia are permanent such as labels.

Communication interface 214 can be used to communicate with the external environment. For example, communication interface 214 can include data port 216 and wireless interface 218 each of which can be used to communicate with an external circuit such as portable media device 102. Communication interface 214 can also include a user information interface 220 suitable for providing information to a user of sports device 200. The information can include audio signals, visual signals, and/or tactile signals. For example, information interface 220 can provide audio signals to speakers included in headphones 124, visual signals to light sources such as LEDs or video signals to a video output device such as video goggles 126, and haptic signals provided to haptic unit 128.

Sports device 200 can be powered by battery 222. When powered by battery 222, sports device 200 can operate in a low power manner. In this regard, microcontroller 202 can be a low power design and can be placed in a sleep/hibernate mode when sports data is not being acquired. In one embodiment, sports device 200 can include activity detector 224 that can monitor transducer 204 to determine whether there is some current sports related activity (e.g., running, walking, etc.) being undertaken. When activity detector 224 determines that there is no sports related activity (or at least not above a threshold level of sports related activity), activity detector 224 can cause or signal the microcontroller 202 to enter a low power mode (i.e., sleep or hibernate). When activity detector 224 determines that there is sports related activity while microcontroller 202 is in the low power mode, activity detector 224 can cause or signal microcontroller 202 to awaken to a normal mode.

In some cases, sports device 200 can be capable of receiving and processing location data. The location data can be based upon, for example, cellular telephone base station locations using various triangulation techniques. In other situations, more accurate positioning information can be obtained using GPS (Global Positioning System) positioning information. When sports device 200 is GPS equipped, sports device 200 can utilize line of sight to GPS antenna 226 to receive GPS satellite signals at GPS receiver 228 from one or more GPS satellites to determine a location of sports device 200 and/or a time of observation. In some embodiments, sports device 200 can include one or more dead reckoning devices 230 to provide direction information or change of location information. Such dead reckoning devices include altimeters, accelerometers, cadence measurement sensors and the like. For example, cadence measurement sensors utilize the rhythmic motion associated with the athletic performance (e.g., the user's strides) to extrapolate the user's speed and distance during periods of satellite blockage thereby further enhancing the robustness of the system in challenging environments with high levels of signal blockage.

When sports device 200 is GPS compliant, RAM 208 can store in addition to selected data such as measured user performance metrics, local elevation data in the form of digital elevation model (DEM) database 232 that stores DEM data. DEM data can serve to improve the accuracy of the GPS elevation and speed measurements as well as to improve the tolerance of sports device 200 to satellite blockage. Processor 202 can be configured to calculate carrier-wave Doppler-shift based user velocity based upon data received from GPS receiver 228 and DEM database 232 and calculate selected athletic performance feedback data using the calculated user velocity and other data such as the elevation profile and the user physical characteristics. The use of Doppler based velocity measurements gives accuracies in the range of 0.1 mph in typical GPS receivers, which is the highest accuracy typically required for useful assessment of athletic activities.

FIGS. 3A and 3B shows representative workout session 300 in accordance with one of the described embodiments. Workout session 300 can be any physical activity such as running, walking, treadmill activity, and so forth that can be enhanced by the use of a sports activity monitoring system. The sports activity monitoring system can include a portable electronic device that can take the form of portable media device (PMD) 302. PMD 302 can include a processor and wireless circuitry that can be used to establish a personal wireless™ network based upon any number of wireless communication protocols such as WiFi™ and BlueTooth™ (hereinafter more simply BT). For example, the BT wireless protocol is a data packet based wireless protocol that relies upon data packets having a specific format and structure as shown in Table 1 below. In particular, a BT data packet can include an access code portion, a header portion, and payload portion each of which can include information useful for implementing various aspects of the described embodiments. For example, information described below with regards to preference lists, input control patterns, etc. can be incorporated into the payload portion of the packet layer.

TABLE 1

| BLUETOOTH ™ PACKET LAYER | | |
| --- | --- | --- |
| ACCESS CODE | HEADER | PAYLOAD |
| 72 BITS used for synchronization, DC offset compensation and identification | 54 BITS contains link control (LC) information | 0-2745 BITS carries voice and data fields of upper layers |

Referring to FIG. 3A, sometime prior to or during the physical activity, PMD 302 must establish a communication channel with a target remote device and more particularly, remote device 304 (also referred to as a sport device, SD) that will be used to gather physical activity data associated with user 306. Depending upon the number and type of sensors included in sport device 304, the physical activity data gathered can be widely varied. The physical activity data can include kinematic data such as running or jogging rate, stride length (both average and instantaneous), foot plant dynamics, and so forth. The physical activity data can also include physiologic data particular to user 306. The physiologic data can include such information as calories burned, oxygen intake, body temperature, breathing rate, heart rate, and so forth. In those cases where sport device 304 includes location determining functionality (such as GPS), the physical activity data can include geographic location, velocity of sport device 304, current and change in elevation, and so on. All, or part, of the physical activity data can then be used to enhance the physical activity engaged by user 306.

Therefore, it is critical for the successful accumulation of activity data associated only with user 306, PMD 302 must establish a communication channel with sport device 304 and no other. This is particularly important in the situation as shown in FIG. 3A where sport devices in addition to (target) sport device 304 in proximity to user 306 are capable of receiving and responding to connection request 308 broadcasted by PMD 302. In order to establish a wireless communication channel between PMD 302 and sport device (SD) 304, in one embodiment, PMD 302 can initiate a pairing process by broadcasting connection request 308 and listening for a connection response. Once the pairing process has been successfully completed, PMD 302 and SD 304 can communicate with each other through the established wireless connection as part of the personal wireless network.

However, in order to begin the pairing process, PMD 302 first broadcasts connection request 308 that can be received at any sport device within range of PMD 302 (i.e., close enough to PMD 302 to receive at least some data packets). For example, SD 310 belonging to bystander 312 can receive data packets 314 associated with connection request 308 sent by PMD 302. Presuming that both SD 304 and SD 310 are both in discoverable mode, there is a likelihood that both SD 304 and SD 310 will both respond to connection request 308. For example, SD 304 can respond with connection response 316 that can include information used by PMD 302 to establish the communication channel between PMD 302 and SD 304. This information can include various encryption parameters, Quality of Service (QoS) parameters, device identifiers, and so forth. However, in addition to SD 304, SD 310 can also respond to connection request 308 by forwarding connection response 318 that includes information similar to that provided in response 316 but relevant to SD 310. Clearly then, the competing responses can mislead PMD 302 to establish the communication channel not with SD 304 as target but with SD 310. In this way, there is a substantial likelihood that PMD 302 will electronically pair with sport devices other than SD 304. Moreover, it is possible, or even likely, that during physical activity itself that PMD 302 will inadvertently pair with other sport devices rather than SD 304 simply due to the proximity of other devices some of which may inadvertently pair with PMD 302.

In another embodiment shown in FIG. 3B, the pairing process can be initiated when PMD 302 is placed in a pairing mode. In the pairing mode, PMD 302 can be configured to "listen" for connection packets. The connection packets can be broadcasted by one or more remote devices that can take the form of sport devices SD 304 and SD 310. Sport devices SD 304 and SD 310 can be prompted to broadcast connection packets in any number of ways. For example, shaking or otherwise moving the sport device can cause the sport device to initiate a broadcast of connection packets. The connection packets can be configured to include information that can be used by PMD 302 to complete the pairing process. For example, with PMD 302 in listening mode, connection packets broadcasted by SD 304 and SD 310 can be detected and analyzed by PMD 302. The data packet analysis can involve processing the information included in the received connection packets. The analyzed information can, in turn, be used by PMD 302 to identify and pair with the target sport device, which in this example is SD 304.

For example, in order to intelligently pair with an appropriate sport device (i.e., target SD), user 306 can set PMD 302 into pairing (or sometimes referred to as linking) mode. In pairing mode, PMD 302 can receive and analyze connection packets 320 broadcasted by SD 304 and connection packets 322 broadcasted by SD 310. In order to identify SD 304 as the target SD, PMD 302 can analyze connection information associated with connection packets 320 and 322. The connection information can include, for example, an input command pattern information, an SD identifier information, and so on. Once PMD 302 has analyzed the connection information received from the broadcasting sport devices (SD 304, SD 310), PMD 302 can use results of the analysis to identify SD 304 as being the target SD. For example, when communication packets 320 and 322 include preferred SD identifier information, PMD 302 can use the preferred SD identifier information to identify SD 304 as the preferred (i.e., target) SD. In this way, PMD 302 can successfully complete the pairing process and establish a communication link with SD 304 and not SD 310.

It should be noted, that in the context of this discussion it is presumed that the remote device is what is referred to as being a thin remote device. By thin it is meant that the remote device has limited computational resources such as processing capabilities and/or memory resources. However, by no means does this presumption preclude the possibility of remote devices that in fact possess substantial computational resources and therefore are capable of providing services akin to that of the more computationally advantaged portable media device.

In the following sections, representative connection diagrams highlighting key features of intelligent pairing between a first device and a target second device are shown. In particular, the first device can take the form of a portable media device, or PMD, whereas the second device can be a thin second device such as a remote device having a sensor used to gather data. In the described embodiments, however, the second device can take the form of a sport device used to gather physical activity data. The physical activity data can include kinesthetic, physiologic, positional, and so on related to a physical activity undertaken by a user.

It should be noted that various logical operations are noted as being performed by the requesting first device in the form of a portable media device (PMD) or any of a number n sport devices (SD(1) through SD(n)) each within range of the requesting PMD. However, it is contemplated that depending upon relevant available computational resources; either the requesting PMD or responding SD can carry out the described logical operations.

Figure 4:
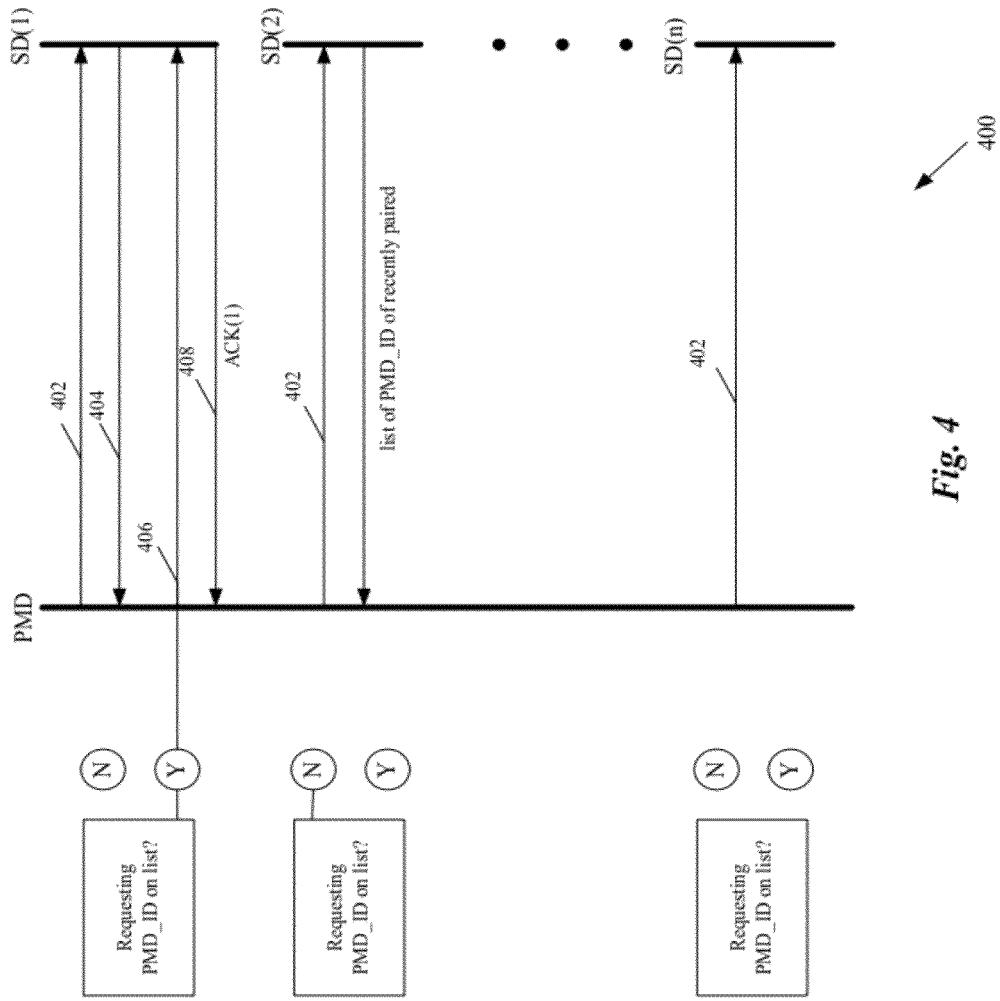
FIGS. 4-8, 10 and 11 show representative connection diagrams in accordance with the described embodiments.

Referring now to FIG. 4 showing a connection diagram describing intelligent pairing process 400 in accordance with the described embodiments. Intelligent pairing process 400 can be carried out by the requesting PMD issuing connection request 402. Connection request 402 can be broadcasted in such a way as to be received by at least n sport devices, SD(1) through SD(n). It should be noted that for the sake of clarity only the remainder of this discussion, the target sport device is presumed to be sport device SD(1). However, in some cases, a receiving sport device SD will not be capable of responding to connection request 402. For example, in those situations where the wireless protocol used by the requesting PMD is based upon BT, then the sport SD is only available for responding to the connection request when the sport device SD is "discoverable". In other words, when the sport device SD is not discoverable, then the sport SD is not capable of responding to the connection request. For example, as shown in FIG. 4, presuming that SD(n) is not discoverable, then SD(n) does not participate in intelligent pairing process 400.

Once connection request 402 has been broadcasted by the PMD, each eligible SD will send connection response 404 that can include in addition to SD specific connection data, a list of portable media device identifiers (PMD_ID) for those portable media devices that have recently paired with that particular sport device. For example, SD(1) can provide a list of recently paired PMD_IDs corresponding to all portable media devices that have successfully paired with SD(1). Depending upon the memory resources available to SD(1), the list of recently paired PMD_IDs can be short or long. Typically, the memory resources made available to SD(1) are rather limited and therefore, the list of recently paired PMD_IDs will most likely be limited to only a few entries reflecting a recent pairing history of SD(1). Once the PMD receives the list of recently paired PMD_IDs, the PMD will query each list received and determine which list, if any, the PMD_ID of the requesting PMD is found. If, as shown in FIG. 4, the PMD_ID of the requesting PMD is found on only one list, then the presumption is that the sending SD is the target sport device, which in this case is SD(1). In this situation, connection accepted command 406 is forwarded to SD(1) that responds with acknowledgment 408 resulting in the PMD electronically pairing with the target (i.e., correct) one of the responding sport devices, namely SD(1).

Figure 5:
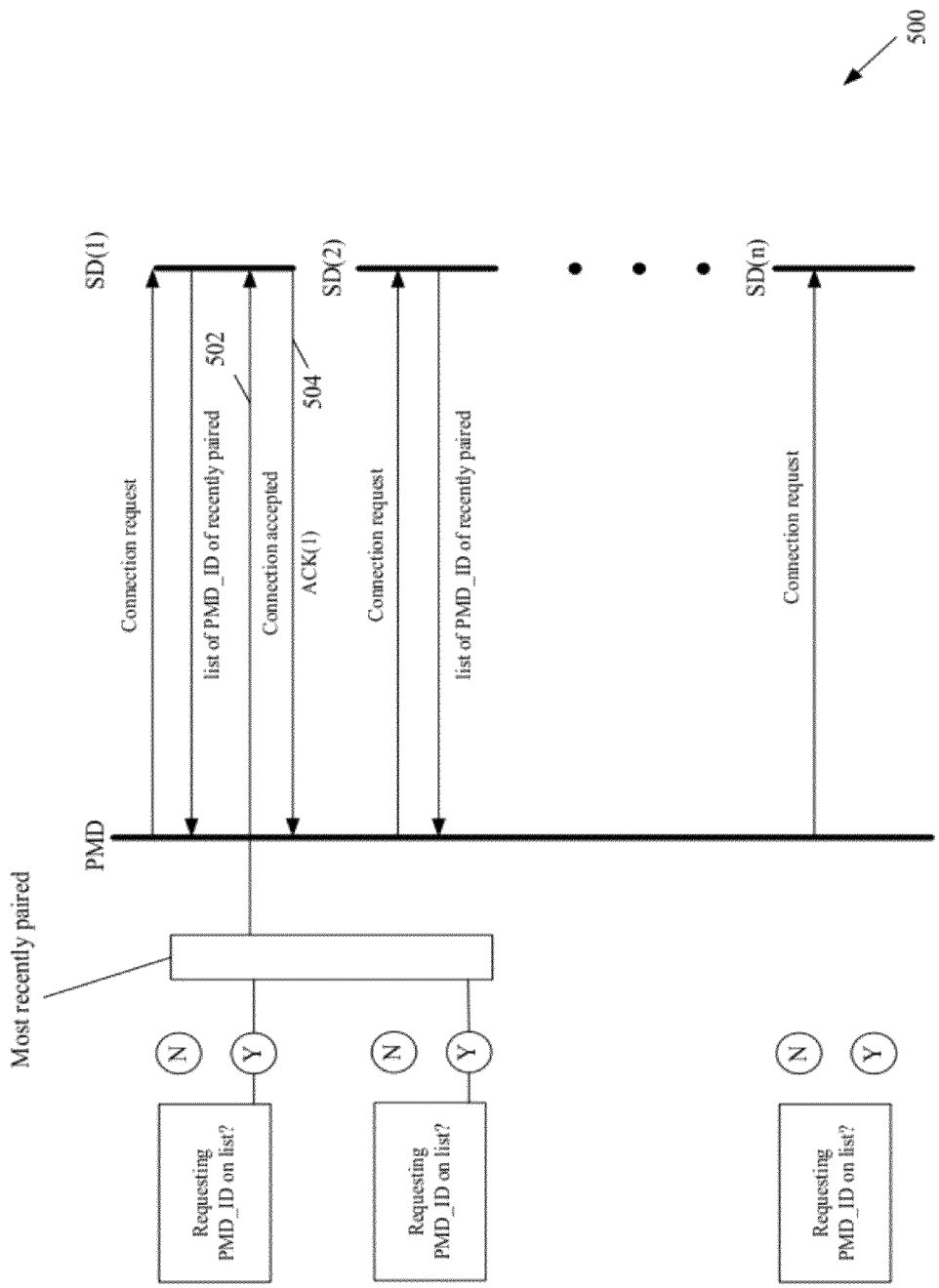

If, however, as shown in FIG. 5 the requesting PMD_ID is included on lists from more than one responding sport device, then the PMD determines the identity of the sport device that the PMD has most recently paired. The presumption here is that the most recently paired sport device is the sport device that is most relevant given the short time frame. In this situation, the PMD sends connection accepted 502 to the sport device to which the PMD has most recently paired, which in this case is again, SD(1) that responds with acknowledgment 504.

Figure 6:
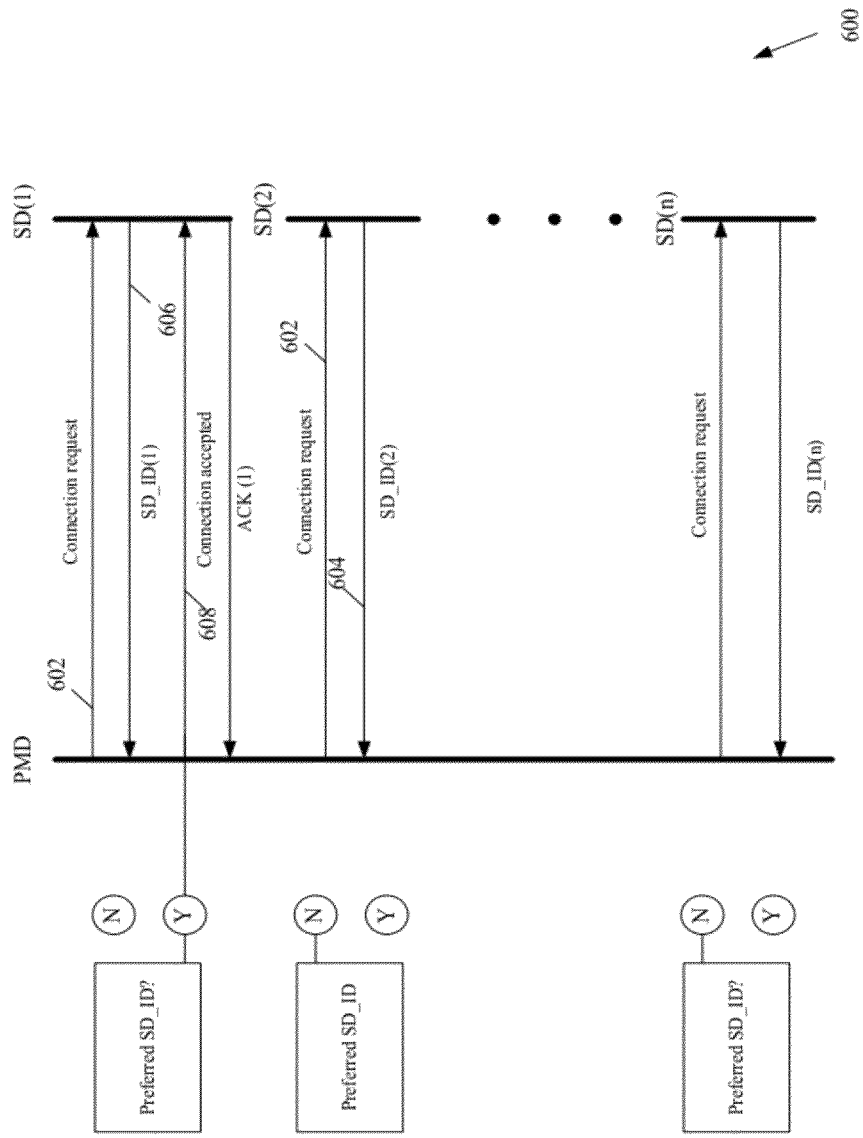

FIG. 6 shows a connection diagram for intelligent pairing process 600 in accordance with the described embodiments. Intelligent pairing process 600 relies upon each responding sport device to provide a sport device identifier, or SD_ID, that uniquely identifies each responding sport device. For example, the PMD broadcasts connection request 602 to which each responding sport device sends a connection response that includes at least the SD_ID corresponding to the responding sport device. For example, sport device SD(2) responds to connection request 602 with connection response 604 that includes SD_ID(2) whereas sport device SD(1) responds to connection request 602 with connection response 606 that includes SD_ID(1). The PMD will review all received sport device identifiers against a list of preferred sport device identifiers. The review can include comparing each received sport device identifier with the list of preferred sport device identifiers and based upon the comparison, determine which of the sport devices to establish the connection. For example, the PMD can review SD_ID(1) from SD(1) and SD_ID(2) from SD(2) to the list of preferred sport device identifiers, which in this example includes only SD_ID(1) associated with SD(1). In this case, the PMD can send connection accepted command 608 that only SD(1) responds with acknowledgement ACK(1) since sport device SD(1) has been determined to be a preferred sport device and can therefore be considered the target sport device.

Figure 7:
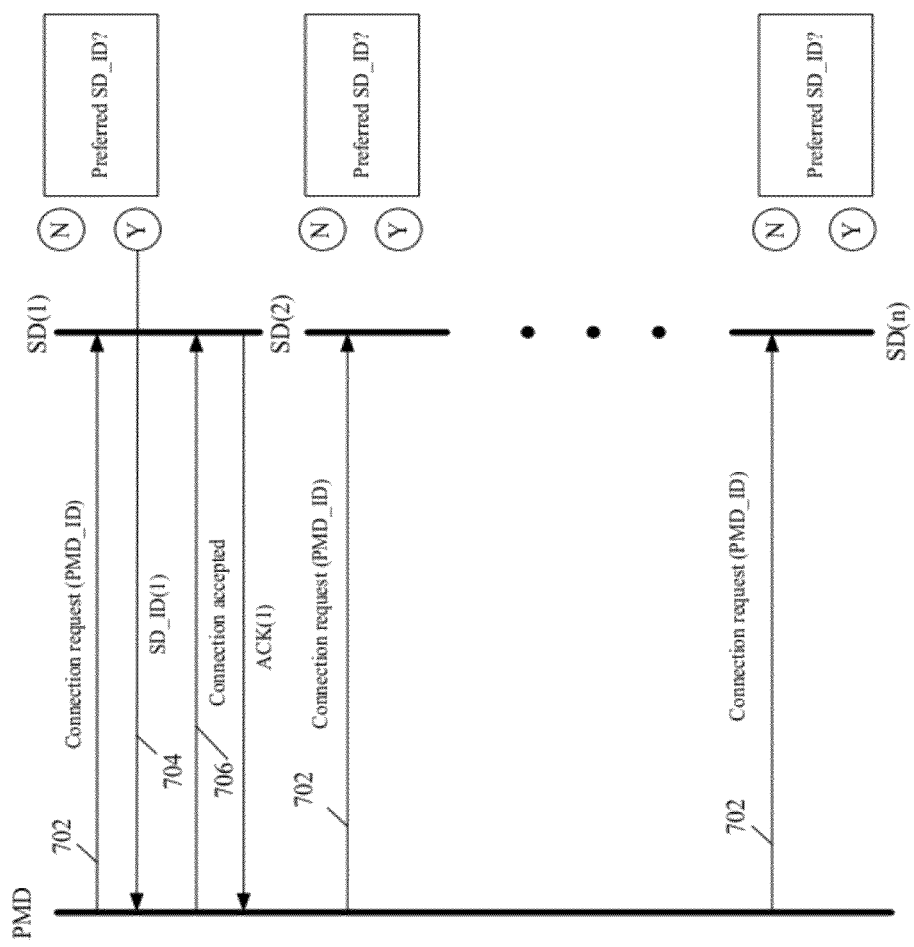
Figure 8:
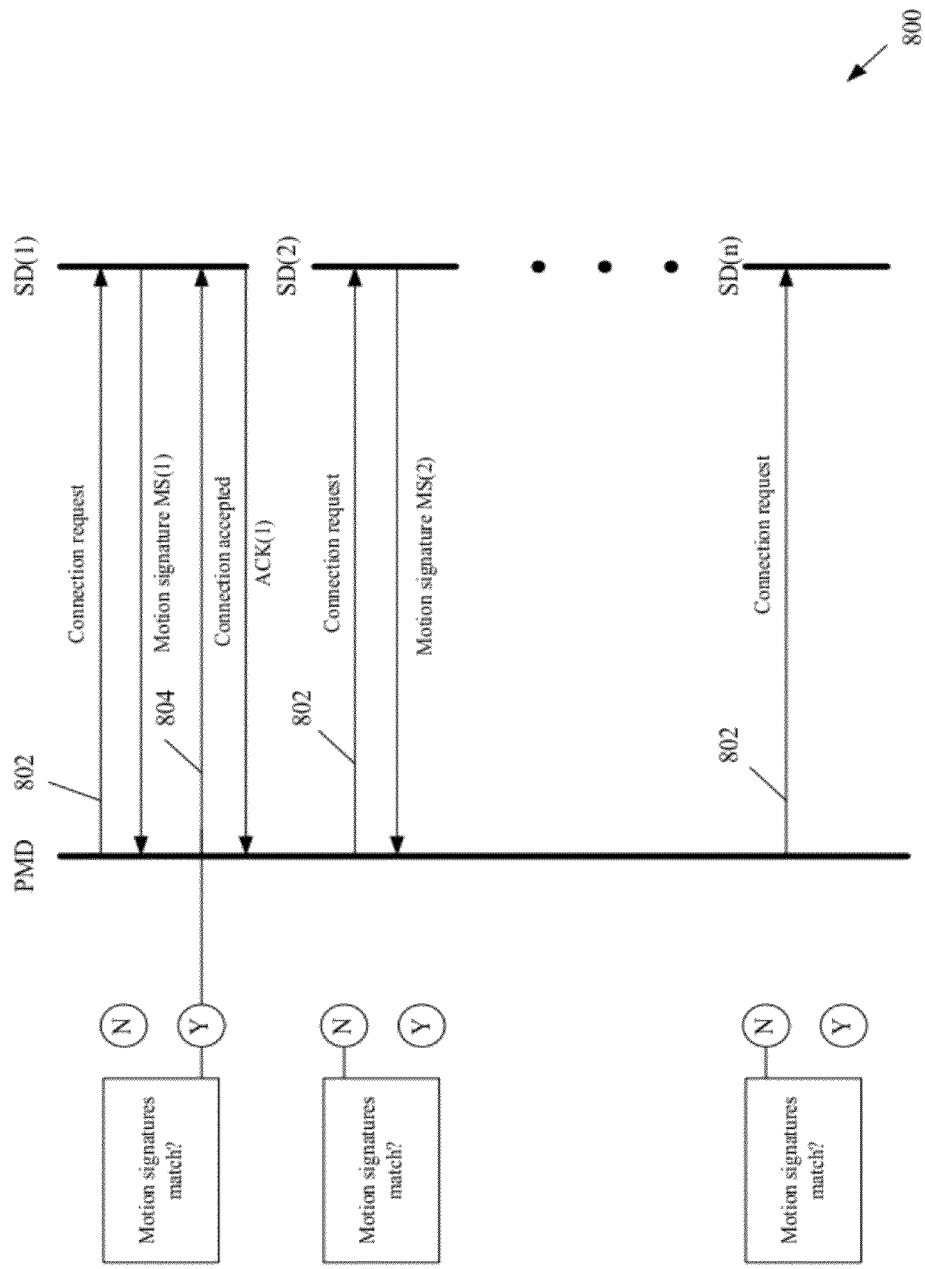

Alternatively, FIG. 7 shows intelligent pairing 700 where the PMD includes the portable media device identifier, or PMD_ID, in connection request 702. In this case, each sport device that receives connection request 702 will perform an enquiry to determine if the received PMD_ID is considered preferred. By preferred it is meant that the requesting portable media device is one that is associated with a particular sport device. This association can be formalized in some embodiments when the portable media device and the sport device are initially purchased as, for example, as a kit. The PMD_ID can be retained in the sport device, either permanently or temporarily when the sport device is re-associated with another, different portable media device. For example, if a sports activity kit is purchased, then the sport device included in the kit can be associated with the purchaser's currently owned portable media device. On the other hand, the sport device can be associated with a portable media device included in the kit. In any case, when and if the time comes to re-associate the sport device to another portable media device, then the preferred PMD_ID value retained in the sport device can be updated in any suitable manner. For example, in some embodiments, the sport device can include a user interface along the lines of a button or switch that when activated can cause the sport device to retain a specific PMD_ID.

Therefore, the only sport device to respond to connection request 702 is that sport device to which the PMD is considered preferred. For example, each sport device SD(1) . . . SD(n) receives connection request 702 that includes the PMD_ID of the requesting PMD. Upon receipt of connection request 702, each sport device SD(1) . . . SD(n) determines if the requesting PMD is preferred based upon a value of the PMD_ID received. In this, only SD(1) provides connection response 704 to which the PMD replies with connection accepted command 706 that only SD(1) responds with acknowledgement ACK(1) indicating that sport device SD(1) is the target sport device.

In another embodiment, the requesting PMD and each sport device can include motion detection capabilities along the lines of an accelerometer, and so forth. In this case, intelligent pairing 800 can be used that relies upon causing both the requesting PMD and the target sport device to undergo essentially the same motion at the same time. This can be likened to a "shake to pair" operation in which motion detectors in both the requesting PMD and the target sport device both sense and record essentially the same movements. This can be accomplished by, for example, user 306 holding both the requesting PMD and the target sport device in such a way that both devices can experience essentially the same movements. These movements can be converted to motion data by the respective motion detectors in the requesting PMD and the target sport device as a motion signature. FIG. 9A shows a representative motion signature 900 in accordance with the described embodiments. Motion signature 900 can correspond to linear acceleration (i.e., shaking) or rotational or any combination thereof of both the PMD and the sport device. In this way, both the PMD and the sport device can retain motion data in the form of motion signature 900 in local memory. For example, a user may hold both the PMD and SD devices in a single hand. The user may then shake the hand such that both devices experience the same motion/movements.

In another embodiment, the user may hold the SD in one hand and the PMD in the other hand. The shake to pair operation can be carried out by the user moving the SD held in one hand and the PMD held in the other hand at about the same time. As long as the motions of both hands occur at about the same time and are at least somewhat related, then time stamps associated with the motion of both hands can be used to assist the PMD in identifying the target SD, or conversely, the target SD identifying itself to the PMD. For example, FIG. 9B shows left handed motion signature 904 associated with movement of the PMD and right handed motion signature 906 associated with movement of the SD. Time stamps TS1 and TS2 associated with motion signatures 904 and 906, respectively, can be used to identify a particular SD as being the target SD. For example, when more than one SD is capable of responding to a connection request by the PMD, each SD can respond with a motion signature and an associated time stamp. The PMD will compare both the time stamp and the motion signature in order to determine which of the responding SDs the target device is. One of the advantages to this approach is that the motion signatures can have a lower degree of correlation than the shake to pair operation that does not use the time stamps. This can be particularly useful when it is difficult to hold both the PMD and SD in the same hand.

Therefore, referring back to FIG. 8, connection request 802 can include an indication for responding sport devices to include a motion signature, if possible. In this way, those sport devices having a motion signature can include the motion signature in the corresponding connection response. For example, both sport devices SD(1) and SD(2) can provide motion signatures, MS(1) and MS(2), respectively whereas sport device SD(n) does not have a motion signature and therefore posts no connection response. In this case, the requesting PMD compares the portable media device motion signature (PMD_MS) against all of the received motions signatures, MS(1) and MS(2), and based upon the comparing sends connection accepted command 804 that only SD(1) responds with acknowledgement ACK(1) resulting in the PMD and SD(1) pairing.

Figure 10:
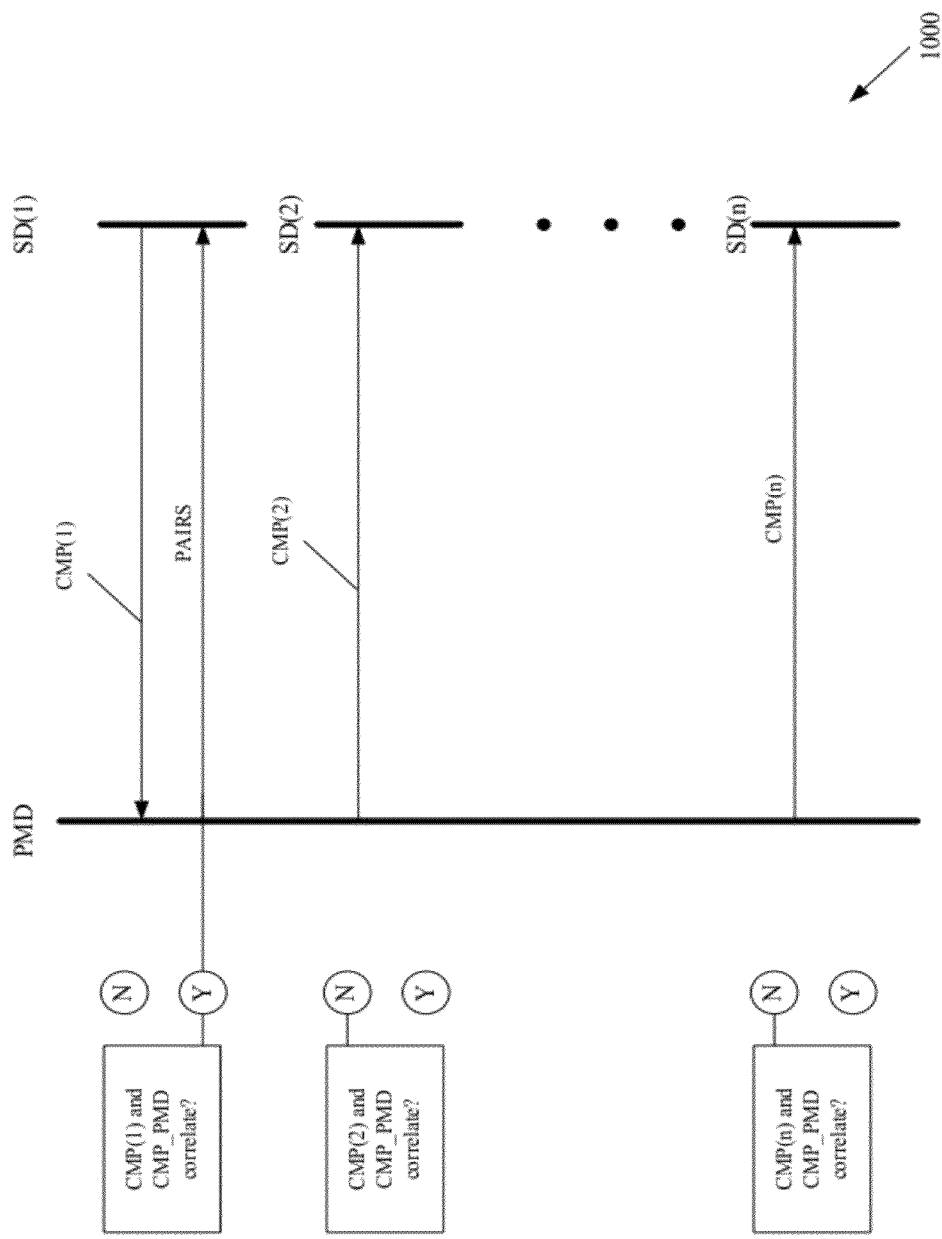

In yet another embodiment, FIG. 10 shows a connection diagram illustrating intelligent pairing process 1000 in accordance with the described embodiments. Intelligent pairing process 1000 is particularly useful when attempting to electronically pair with a sport device during a group physical activity such as a race where more than one sport device is available for pairing. In this case, a user can place the PMD in pairing mode. In pairing mode, the PMD can listen for connection packets broadcasted by a plurality of sport devices only one of which is a target sport device. As part of the connection packet, information in the form of a current motion profile can be included, the current motion profile characterizing the motion of the sport device over a period of time. For example, a sport device equipped with a motion detector and adequate memory storage and processing resources can detect the motion of the sport device over time and store that information as the current motion profile. The amount of memory and processing resources available to the sport device will dictate how extensive and comprehensive the current motion profile can be. Of course, the more comprehensive and extensive the motion profile, the greater its usefulness.

Accordingly, each sport device capable of broadcasting a connection packet with a corresponding motion profile will do so. For example, each of the sport devices SD(1) . . . SD(n) can broadcast connection packet 1002 each of which can include a corresponding current motion profile CMP(1) . . . CMP(n), respectively. The listening PMD will then compare each of the received current motion profiles CMP(1) . . . CMP(n) to a current motion profile of the portable media device, CMP_PMD. The sport device having a current motion profile that most closely matches that of the listening PMD is identified as the target SD. The PMD then electronically pairs only with the target sport device.

Figure 11:
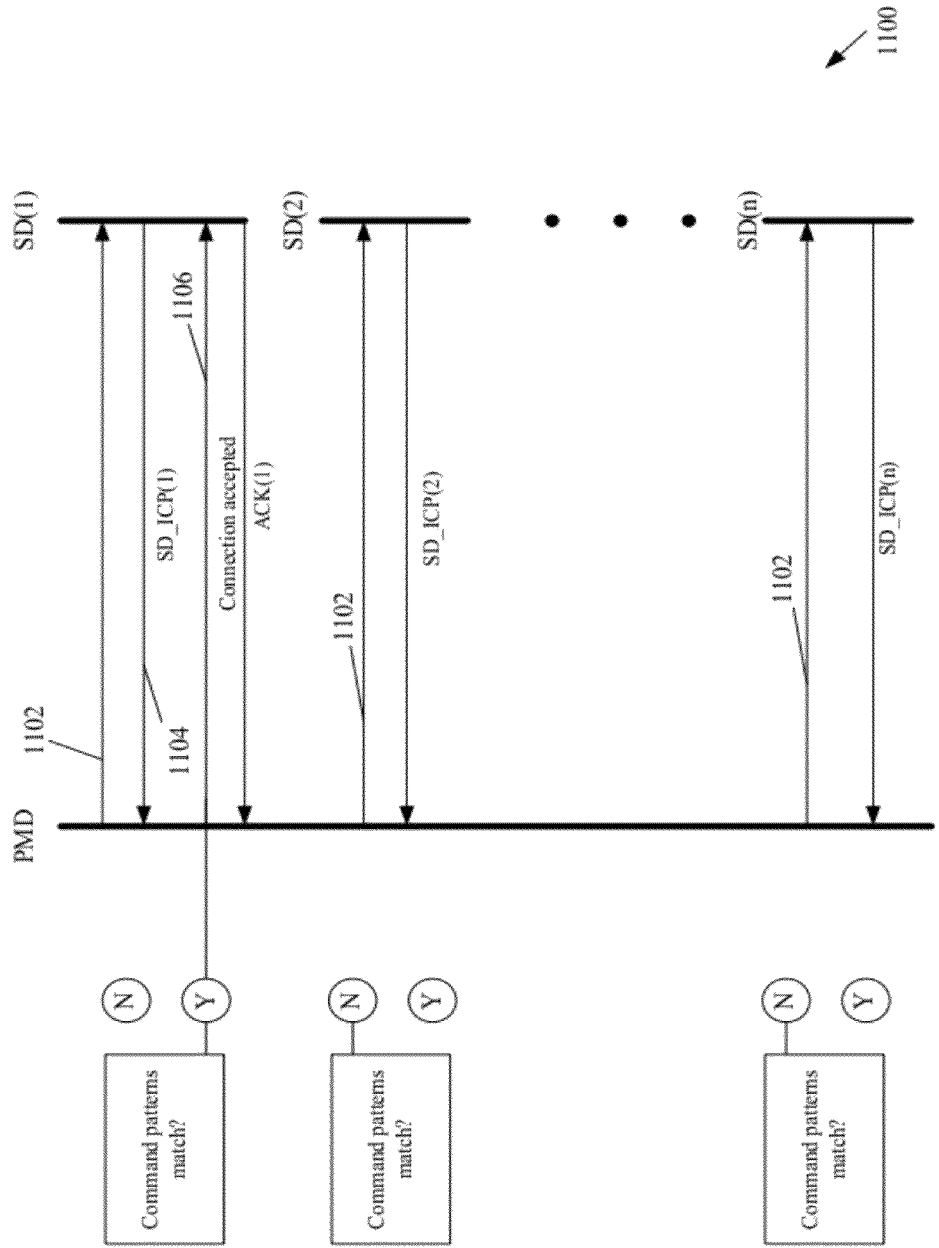

In yet another embodiment, FIG. 11 shows a connection diagram illustrating intelligent pairing 1100 that utilizes command patterns to specify which one of a number of sport devices is the sport device to which the requesting PMD intends to pair. By command pattern it is meant that a pattern of input commands (ON, OFF, UP, DOWN, etc.) is provided to either or both of the requesting PMD and target sport device. This command pattern can then be used to identify which of the sport devices in wireless range of the requesting PMD is the target sport device.

For example, the requesting PMD can issue connection request 1102 that includes an input command pattern request. The input command pattern can be a series of input commands. In some cases, duration of time between input commands can be considered as part of the input command pattern, whereas in other cases the input command pattern can be considered only the time duration between input commands and not the input commands themselves. In any case, each of the sport devices so configured can forward an associated sport device input command pattern SD_ICP retained in the respective sport device. The requesting PMD then compares the received input command pattern and issues connection accepted command that is acknowledged by the sport device issuing the matching input command pattern. For example, each of sport devices SD(1) . . . SD(n) receives connection request 1102 having input command pattern request. Each of the sport device SD(1) . . . SD(n) respond with connection response 1104 that includes their respective input command pattern SD_ICP(1) . . . SD_ICP(n) that the requesting PMD uses to determine the identity of the target sport device by issuing connection accepted command 1106 that is acknowledged by the target sport device with acknowledgment ACK which in this case sport device SD(1) responds with ACK(1) resulting in the PMD and SD(1) pairing.

It should be noted that in some cases, the sport device itself can have sufficient computational resources to perform the requisite processing to confirm the input command pattern received from the requesting PMD. In this case, the only sport device to respond to connection request 1102 is that sport device that confirms the requesting portable media device input command pattern.

FIGS. 12-17 show various flowcharts detailing a number of processes for intelligent pairing of a first device and a second device in accordance with the described embodiment. The intelligent pairing processes are suitable in those electronic pairing situations between a requesting first device and a target second device when at least two different second devices, only one of which is the target second device, are eligible to respond to a connection request by the requesting first device.

Figure 12:
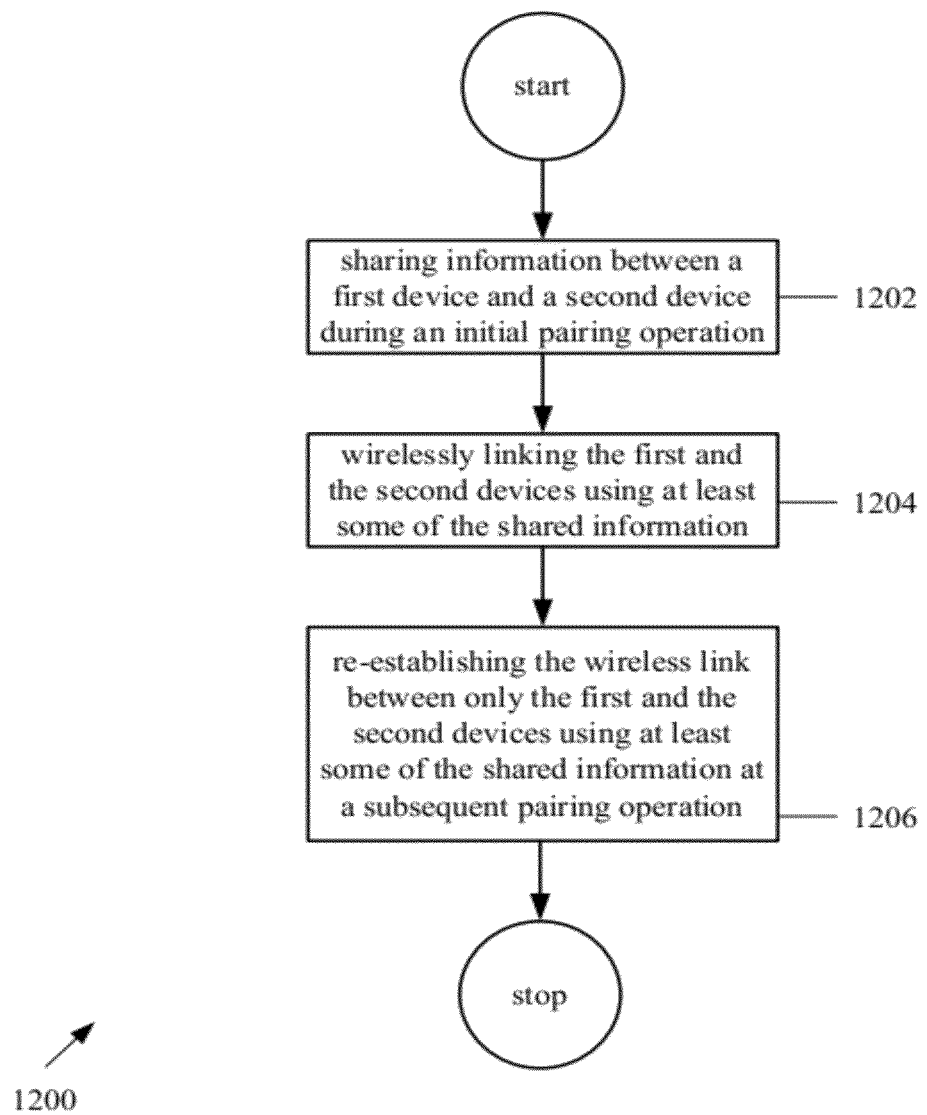

For example, FIG. 12 shows a flowchart detailing overall process 1200 for intelligently pairing a first and a second device in accordance with the described embodiments. Process 1200 can begin at 1202 where information is shared between the first device and the second device during an initial pairing operation. The information can include, for example, information in the form of motion translated into a motion signature that is shared between the first and the second device. Other information can include input control pattern information, device identifiers, and so on. Next at 1204, the first and the second devices use the shared information to establish a wireless communication link. The wireless communication link can be used to pass other information between the first and the second devices. The other information can include, for example, physical activity data when the first device is a portable media device, or PMD, and the second device is a sensing device capable of sensing physical activity and passing physical activity data to the PMD. At 1206 the wireless link can be between the first and second devices can be re-established using at least some of the shared information.

Figure 13:
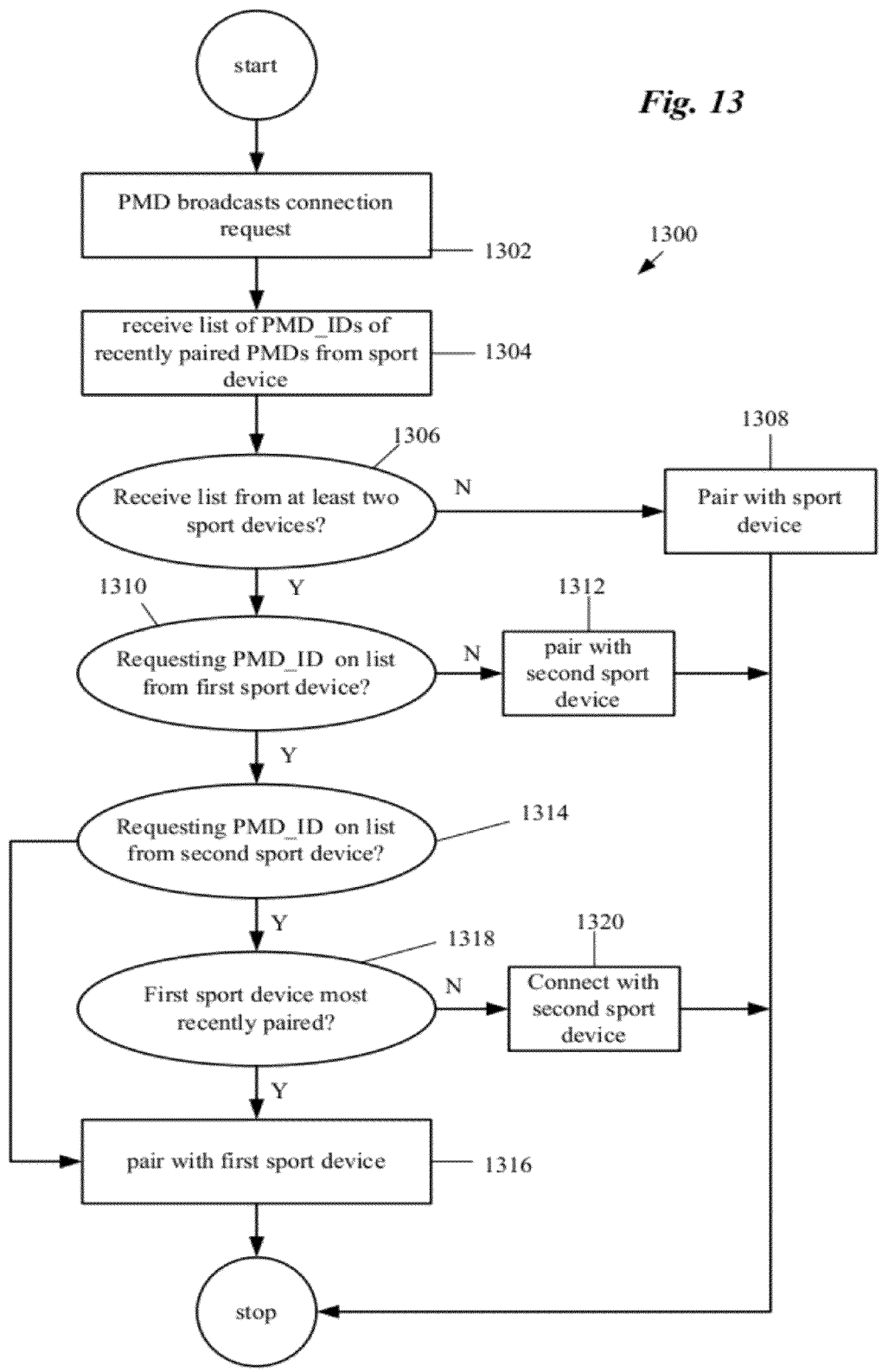

FIG. 13 shows a flowchart detailing intelligent pairing process 1300 along the lines of connection diagrams shown in FIGS. 4 and 5. In particular, intelligent pairing process 1300 describes using a temporal order of pairing to determine which one of at least two available sport devices is the target sport device. Accordingly, process 1300 can begin at 1302 when the PMD broadcasts a connection request. Since the PMD is broadcasting and not uni-casting the connection request, any sport device within range of the PMD can receive and potentially respond to the connection request. Thus, at 1304, the PMD receives a list of identifiers of portable media devices (PMD_ID) that have recently paired with the responding sport devices. It should be noted that each responding sport device responds with a corresponding list of recently paired PMD_IDs. If, at 1306, the PMD determines that lists from only one sport device is received, then at 1308, the PMD electronically pairs with the only sport device to respond. However, if the PMD determines that more than one sport device has responded, then at 1310, the PMD determines if the identifier of the requesting PMD is included in the list received from a first responding sport device. If the requesting PMD determines that that PMD_ID of the requesting PMD is not on the list received from the first responding sport device, then at 1312, the requesting PMD pairs with the second sport device to respond.

On the other hand, if the PMD_ID of the requesting PMD is determined to be on the list received from the first sport device to respond, then at 1314, the requesting PMD determines if the PMD_ID of the requesting PMD is on the list received from the second sport device to respond. If it is determined that the PMD_ID of the requesting PMD is not on the list received from the second sport device to respond, then at 1316, the PMD pairs with the first sport device to respond, otherwise, at 1318, a determination is made if the first sport device to respond is the most recent sport device to pair with the requesting PMD. If it is determined that the first sport device is not the most recent sport device to pair with the requesting PMD, then at 1320, the PMD pairs with the second sport device, otherwise the requesting PMD pairs with the first sport device at 1316.

Figure 14:
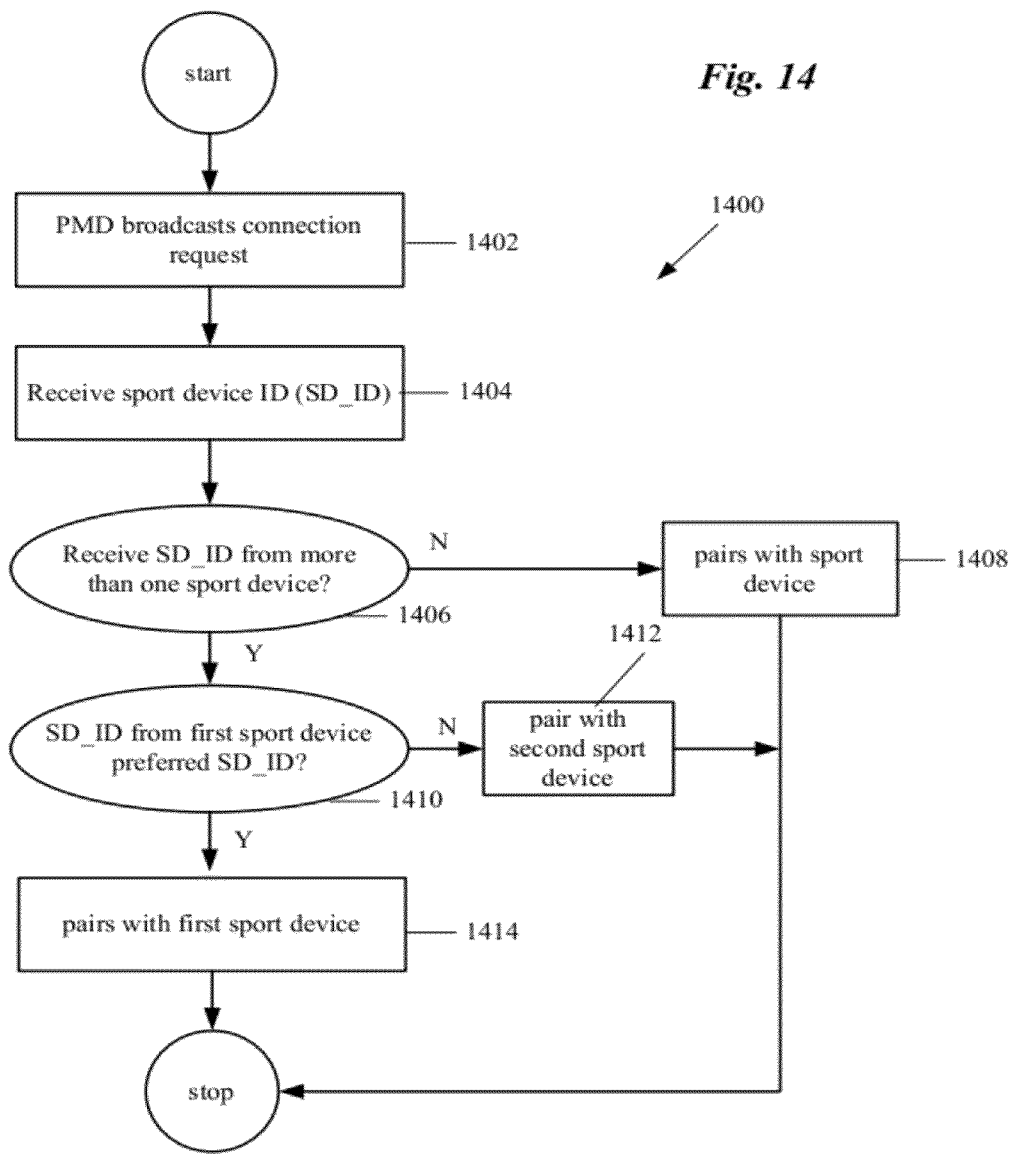

FIG. 14 shows a flowchart detailing intelligent pairing process 1400 along the lines of the intelligent pairing process shown in FIG. 6. In particular, process 1400 can begin at 1402 by the requesting PMD broadcasting a connection request. In response to the connection request, any sport device that can receive the broadcasted connection request can respond at 1404 with a sport device identifier (SD_ID). At 1406, the requesting PMD determines if a sport device identifier has been received from more than one sport device. If the requesting PMD determines that a sport device identifier has not been received from more than one sport device, at 1408, the requesting PMD pairs with the only sport device to respond with the sport device identifier. On the other hand, if a sport device identifier was received from more than one sport device, then at 1410, the requesting PMD determines if the sport device identifier received from the first responding sport device is on a list of preferred sport devices. If the sport device identifier is determined to not be included on the list of preferred sport identifiers, then at 1412, the requesting PMD pairs with the second sport device, otherwise at 1414, the requesting PMD pairs with the first sport device.

Figure 15:
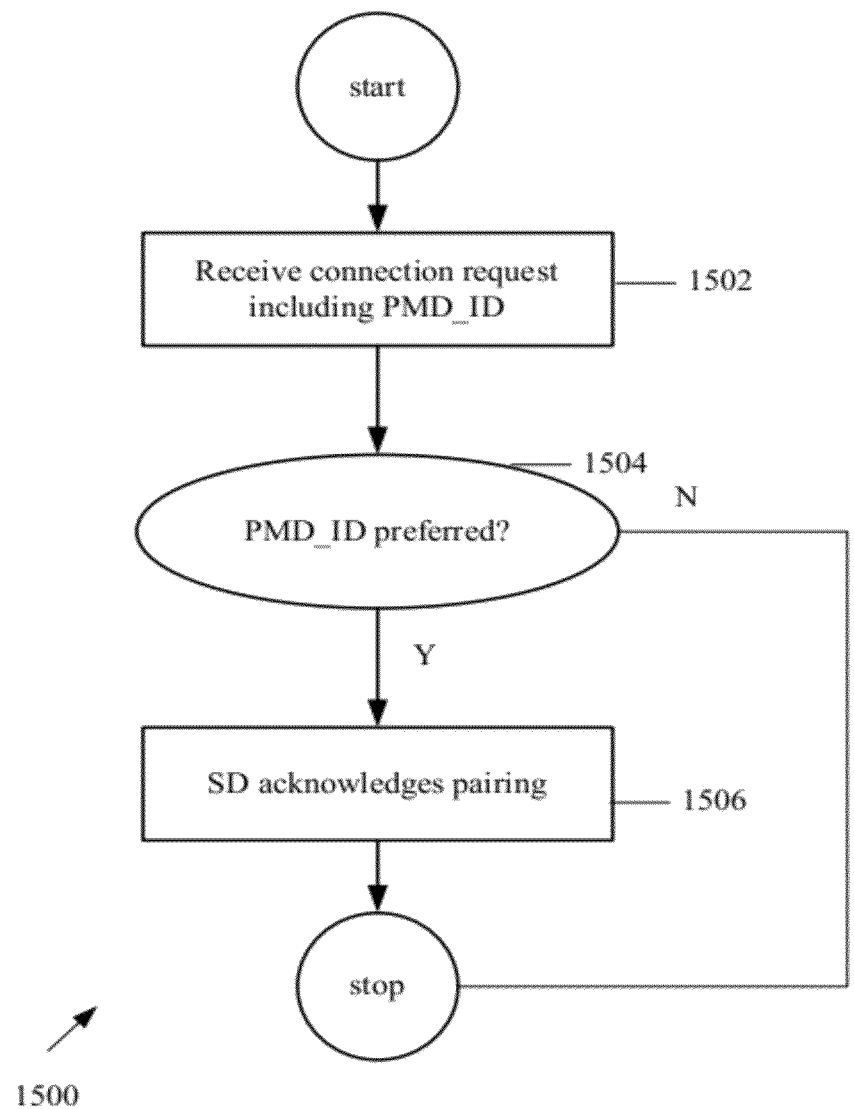

FIG. 15 shows a flowchart detailing intelligent pairing process 1500 along the lines of the intelligent pairing process shown in FIG. 7. In particular, process 1500 can begin at 1502 a sport device receiving a connection request from a requesting PMD, the connection request including at least a PMD_ID of the requesting PMD. Next at 1504, the sport device determines if the PMD_ID of the requesting PMD is included on a list of preferred PMDs stored locally at the sport device. If the sport device determines that the PMD_ID of the requesting PMD is not included on the list of preferred PMDs, then the sport device does not post a response to the received connection request and process 1500 ends. On the other hand, if the sport device determines that the requesting PMD is preferred, then at 1506, the sport device forwards a connection acceptance to the requesting PMD that then pairs with the responding sport device. In this way, the message traffic between the requesting PMD and the sport devices capable of receiving the connection request sent by the requesting PMD is limited to only the single sport device having the requesting PMD as preferred.

Figure 16:
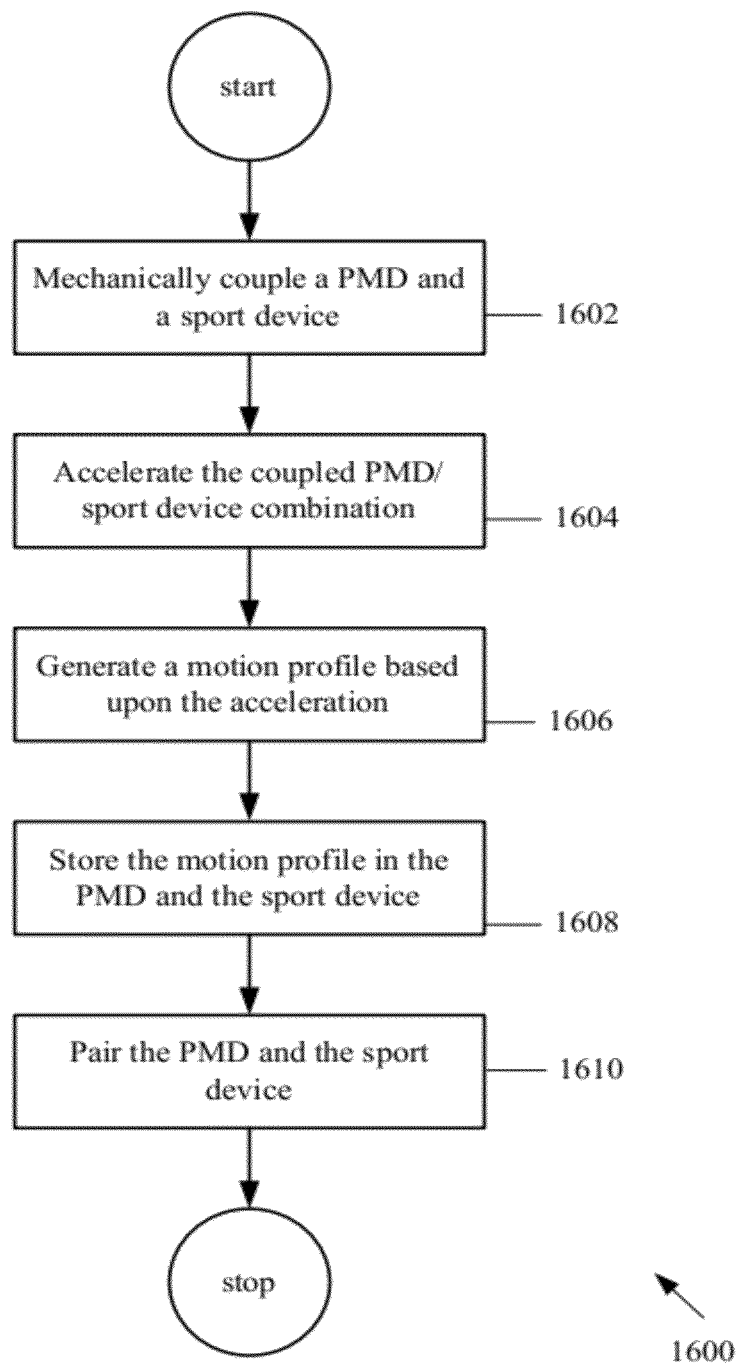

FIG. 16 shows a flowchart detailing process 1600 for electronically pairing a portable media device (PMD) and a remote device such as a sport device that can be used to capture physical activity data during a physical activity. Process 1600 can be referred to as a "shake to pair" process whereby the PMD and the sport device are brought in physical contact with each other and undergo essentially the same accelerated motion. The accelerated motion can be any form of acceleration such as translational acceleration, acceleration due to rotation, or any combination thereof. Accordingly, process 1600 can begin at 1602 by mechanically coupling the PMD and the sport device. The mechanical coupling can be as simple as holding the PMD and the sport device together in one hand, or in a carrying case in such a way that the PMD and the sport device experience essentially the same motion and acceleration. At 1604, the mechanically coupled PMD/sport device combination undergoes an acceleration event that is used to generate a motion signature at 1606. The motion signature can be generated by motion detectors in either or both the PMD and the sport device. In some cases, either the sport device or the PMD does not include a motion detector, in which case, the device that does include a motion detector will generate the motion signature and pass the motion signature to the other device. In any case, the motion signature is retained in both the PMD and the sport device at 1608 and at 1610 the PMD and the sport device are paired.

Figure 17:
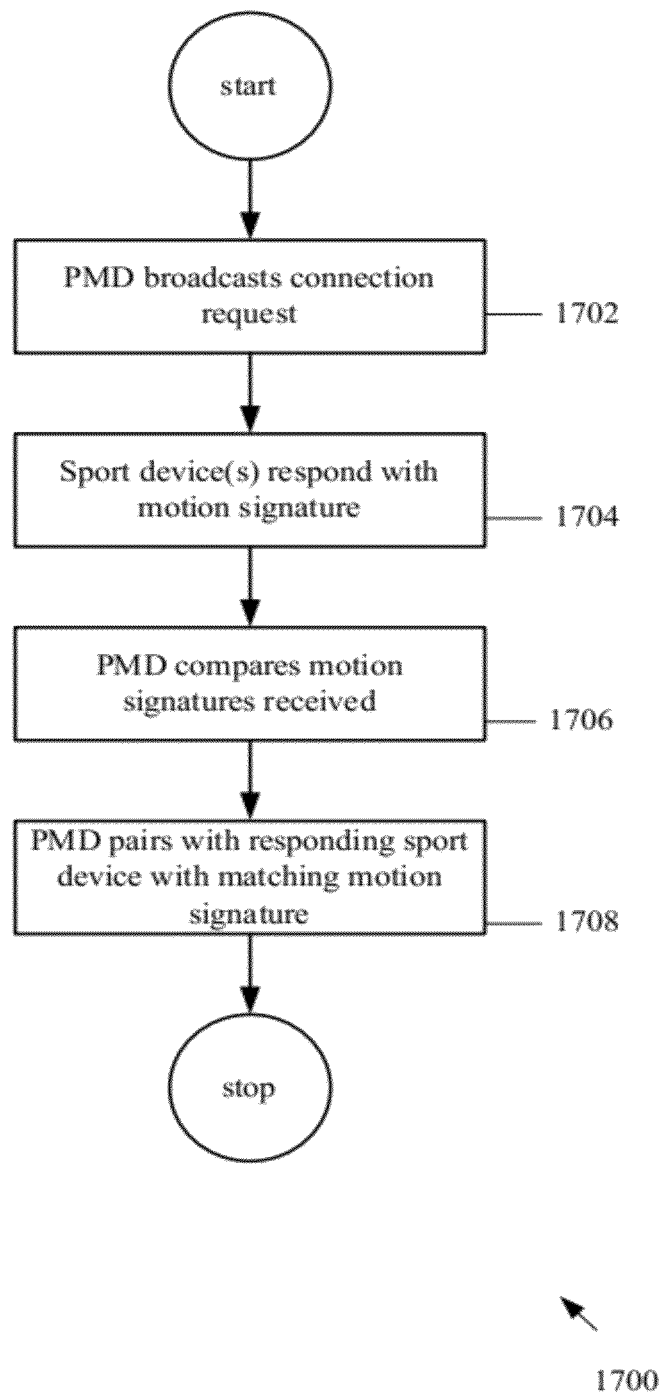

FIG. 17 shows a flowchart detailing process 1700 for intelligent pairing of a requesting PMD and a sport device subsequent to an initial pairing as described in FIG. 1600 using the shake to pair process. In this situation, in order to re-establish a connection between the PMD and the sport device, the PMD broadcasts a connection request at 1702. At 1704, sport device(s) respond to the connection request by providing a motion signature. Each of the received motion signatures can be compared by the PMD to the motion signature retained in the PMD at 1706. At 1708, the PMD pairs with the sport device that responded with a motion signature that matches the retained motion signature.

Figure 18:
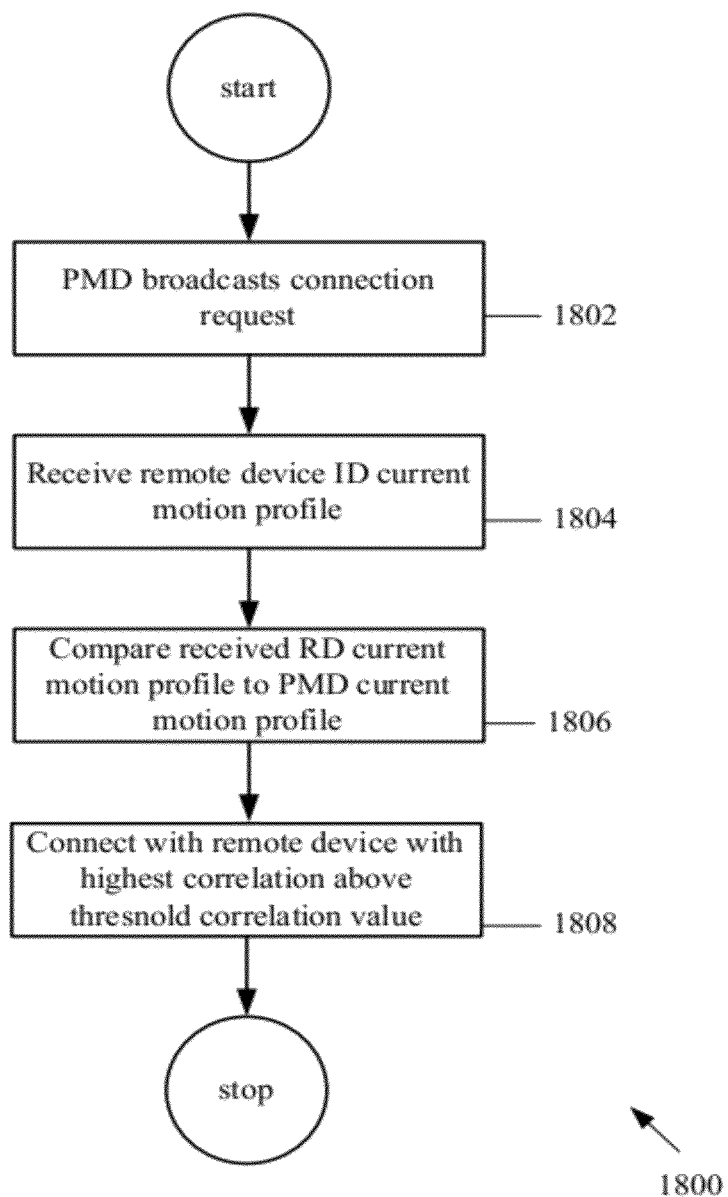

FIG. 18 shows a flowchart detailing intelligent pairing process 1800 along the lines of connection diagram shown in FIG. 10 that uses a current motion profile generated at the requesting PMD and the sport device. Process 1800 is particularly well suited for those situations during a physical activity where a connection between the PMD and the sport device must be re-established. In this case, current motion profiles are generated and stored in each of the PMD and the sport device. The current motion profile can be a record of most recent physical activity that can take the form of, for example, motions, speed and speed changes, elevation changes, etc. Since the PMD and the sport device are expected to be physically coupled together by way of the user, than the motion profiles should at least correlate highly with each other.

Accordingly, process 1800 can begin at 1802 by the PMD broadcasting a connection request. At 1804, the sport device can respond with a current motion profile corresponding to the responding sport device. It should be noted that even in situations such as a race where a number of nearby participants undergo similar motion and would thus potentially generate similar current motion profiles, it is highly unlikely that any current motion profiles except for that of the requesting PMD and target sport device would match or at least highly correlate. Therefore, at 1806, the PMD compares all received motion profiles and at 1808, pairs with the sport device having the current motion profile that matches or at least correlates highly with the current motion profile of the PMD.

Figure 19:
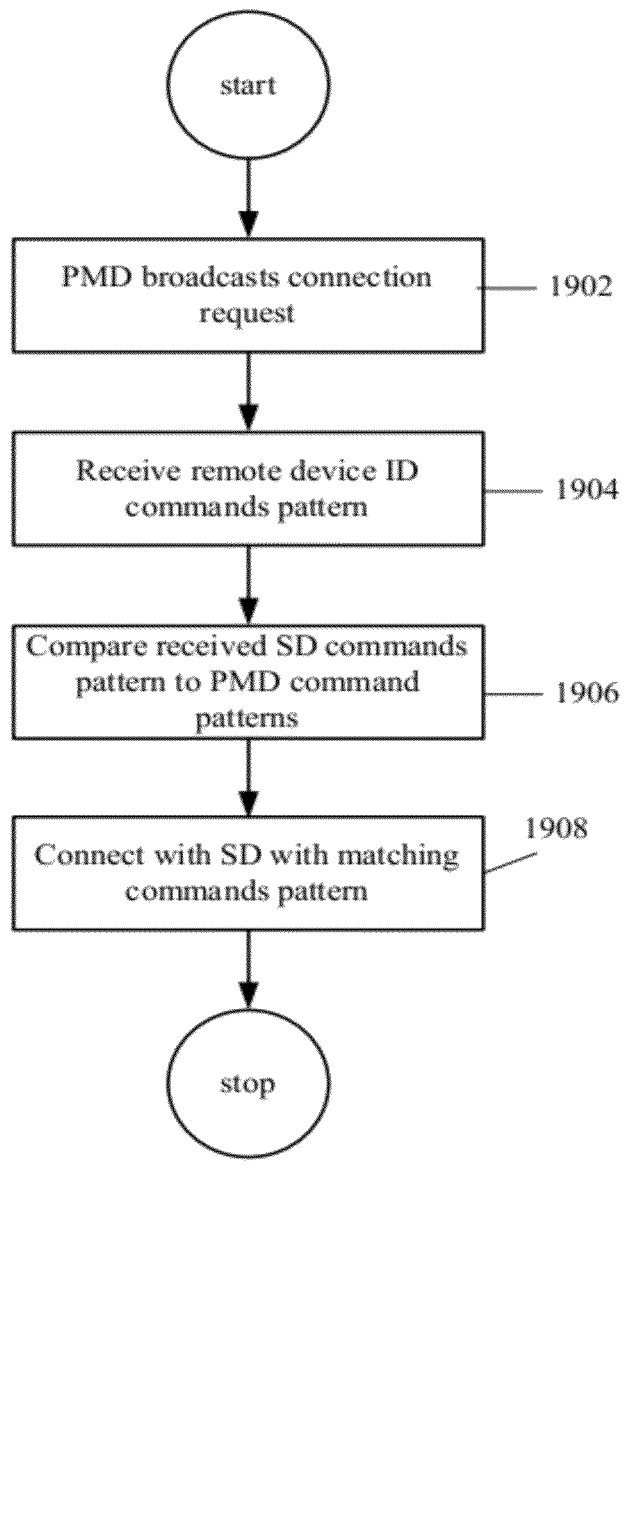

FIG. 19 shows a flowchart detailing intelligent pairing process 1900 along the lines of connection diagram shown in FIG. 11 that uses an input command pattern generated at either the requesting PMD or the sport device. The input command pattern can be formed of input events such as engaging an OFF input and an ON input, a volume control, or any combination thereof. For example, an input command pattern can take the form of, for example, {ON OFF ON OFF ON VOL UP <duration of time> OFF ON}. In this example, the input command pattern includes not only various input commands but a duration of time that can be used to make the input command pattern more distinct. This can be particularly important in situations where either the PMD or sport device is not capable of generating a sufficient number of different command inputs.

Accordingly, process 1900 can begin at 1902 by the PMD broadcasting a connection request, the connection request including a request for an input command pattern if available. At 1904, the requesting PMD receives responses from all sport devices capable of responding with an input command pattern. At 1906, the PMD compares the entire received input command pattern to the input command pattern retained at the PMD. At 1908, the PMD pairs with the sport device that responded with the input command pattern that matches the retained input command pattern.

Figure 20:
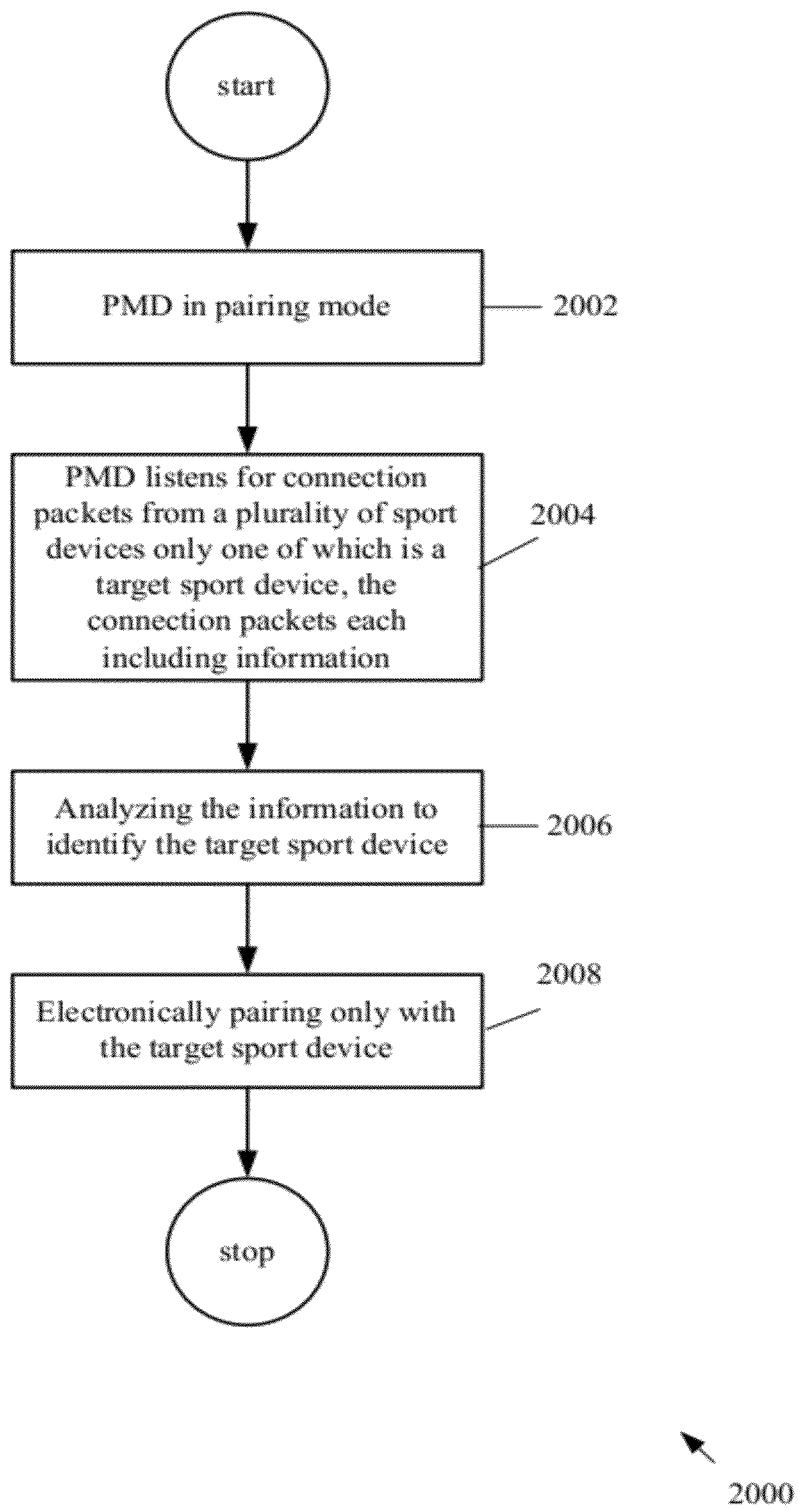

FIG. 20 shows a flowchart detailing process 2000 for intelligently pairing electronic devices in accordance with the described embodiments. Process 2000 can start at 2002 by a personal media device (PMD) in pairing (or linking) mode. In pairing mode, the PMD can listen for connection packets at 2004 broadcasted from a plurality of sport devices only one of which is a target sport device. The sport devices can be prompted to broadcast the connection packets by, for example, shaking or otherwise moving the sport devices. The connection packet can include information that can be analyzed by the PMD to identify only one of the broadcasting sport devices as a target sport device at 2006. The PMD can then pair with the identified sport device at 2008.

Figure 21:
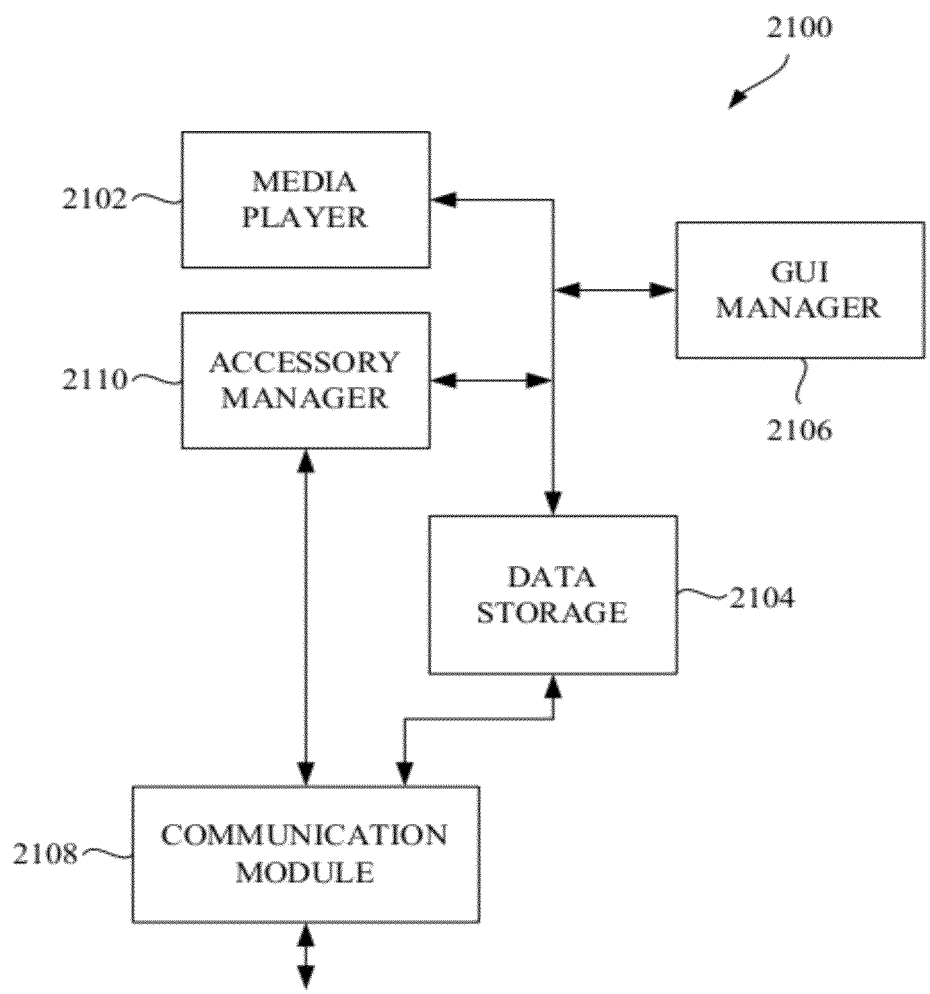
FIGS. 21-22 show representative portable media device in accordance with the described embodiments.

FIG. 21 is a block diagram of an arrangement 2100 of functional modules utilized by a portable media device. The portable media device can, for example, be portable media device 102 illustrated in FIG. 1. The arrangement 2100 includes a media player 2102 that is able to output media for a user of the portable media device but also store and retrieve data with respect to data storage 2104. The arrangement 2100 also includes a graphical user interface (GUI) manager 2106. The GUI manager 2106 operates to control information being provided to and displayed on a display device. The arrangement 2100 also includes a communication module 2108 that facilitates communication between the portable media device and an accessory device. Still further, the arrangement 2100 includes an accessory manager 2110 that operates to authenticate and acquire data from an accessory device that may be coupled to the portable media device. For example, the accessory device can be a wireless interface accessory, such as the wireless interface accessory 106 illustrated in FIG. 1 as being coupled to portable media device 102.

Figure 22:
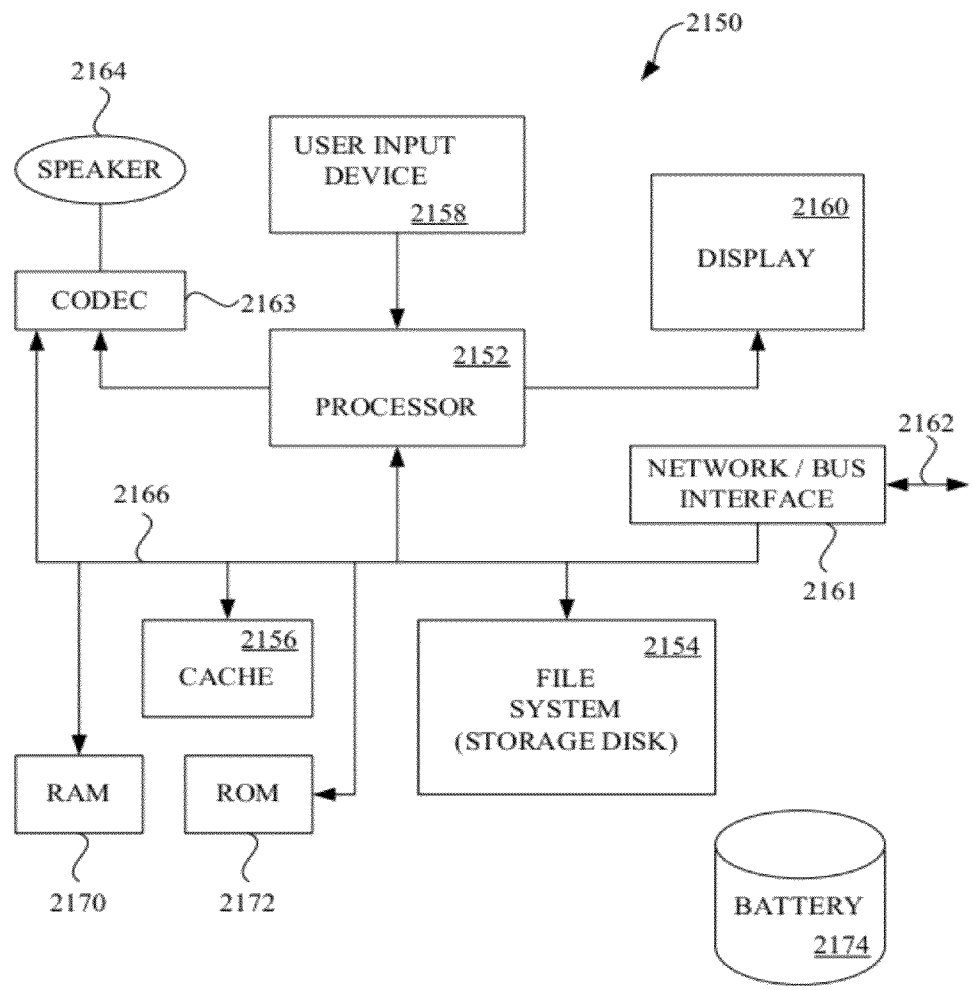

FIG. 22 is a block diagram of a media player 2150 suitable for use with the described embodiments. The media player 2150 illustrates circuitry of a representative portable media device. The media player 2150 includes a processor 2152 that pertains to a microprocessor or controller for controlling the overall operation of the media player 2150. The media player 2150 stores media data pertaining to media items in a file system 2154 and a cache 2156. The file system 2154 is, typically, a storage disk or a plurality of disks. The file system 2154 typically provides high capacity storage capability for the media player 2150. However, since the access time to the file system 2154 is relatively slow, the media player 2150 can also include a cache 2156. The cache 2156 is, for example, Random-Access Memory (RAM) provided by semiconductor memory. The relative access time to the cache 2156 is substantially shorter than for the file system 2154. However, the cache 2156 does not have the large storage capacity of the file system 2154. Further, the file system 2154, when active, consumes more power than does the cache 2156. The power consumption is often a concern when the media player 2150 is a portable media device that is powered by a battery 2174. The media player 2150 can also include a RAM 2170 and a Read-Only Memory (ROM) 2172. The ROM 2172 can store programs, utilities or processes to be executed in a non-volatile manner. The RAM 2170 provides volatile data storage, such as for the cache 2156.

The media player 2150 also includes a user input device 2158 that allows a user of the media player 2150 to interact with the media player 2150. For example, the user input device 2158 can take a variety of forms, such as a button, keypad, dial, touch screen, audio input interface, video/image capture input interface, input in the form of sensor data, etc. Still further, the media player 2150 includes a display 2160

(screen display) that can be controlled by the processor 2152 to display information to the user. A data bus 2166 can facilitate data transfer between at least the file system 2154, the cache 2156, the processor 2152, and the CODEC 2163.

In one embodiment, the media player 2150 serves to store a plurality of media items (e.g., songs, podcasts, etc.) in the file system 2154. When a user desires to have the media player play a particular media item, a list of available media items is displayed on the display 2160. Then, using the user input device 2158, a user can select one of the available media items. The processor 2152, upon receiving a selection of a particular media item, supplies the media data (e.g., audio file) for the particular media item to a coder/decoder (CODEC) 2163. The CODEC 2163 then produces analog output signals for a speaker 2164. The speaker 2164 can be a speaker internal to the media player 2150 or external to the media player 2150. For example, headphones or earphones that connect to the media player 2150 would be considered an external speaker.

The media player 2150 also includes a network/bus interface 2161 that couples to a data link 2162. The data link 2162 allows the media player 2150 to couple to a host computer or to accessory devices. The data link 2162 can be provided over a wired connection or a wireless connection. In the case of a wireless connection, the network/bus interface 2161 can include a wireless transceiver. The media items (media assets) can pertain to one or more different types of media content. In one embodiment, the media items are audio tracks (e.g., songs, audio books, and podcasts). In another embodiment, the media items are images (e.g., photos). However, in other embodiments, the media items can be any combination of audio, graphical or video content.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method, comprising:
    sharing information between a first device and a second device during an initial pairing operation, wherein the shared information is motion data;
    generating the motion data by,
        mechanically associating the first device and the second device,
        moving the first device and second device, while mechanically associated, such that first device and the second device experience correlated movements,
        recording the movements of the first device, including associated timing information, as first device motion data, and the movements of the second device, including associated timing information, as second device motion data,
        retaining the first device motion data as a first device motion signature in
        the first device and the second device motion data as a second device motion signature in the second device;
    wirelessly linking the first and the second devices using at least some of the shared information; and
    after the wireless link has been severed, re-establishing the wireless link between only the first and the second devices using at least some of the shared information at a subsequent pairing operation.

2. The method as recited in claim 1, wherein the first device is a personal media device (PMD) and wherein the second device is a sport device(SD), the sport device including at least one sensor.

3. The method as recited in claim 2, wherein the shared information is at least one of the following:
    a list that includes at least one preferred personal media device identifier (PMD_ID), an input command pattern, information related to current proximity of the first device and the second device, a list that includes at least one PMD_ID corresponding the PMD recently paired with a target SD, a preferred PMD_ID, and a preferred sport device identifier (SD_ID).

4. The method as recited in claim 1, further comprising:
    using the first motion signature and the second motion signature to subsequently pair the first device and the second device.

5. The method as recited in claim 4, further comprising:
    broadcasting a pairing request by the first device, the pairing request including at least a request for a motion signature;
    receiving the motion signature from a responding second device;
    comparing the received motion signature to the motion signature retained in the first device; and
    pairing the first device and the responding second device when the received motion signature effectively matches the motion signature retained in the first device.

6. The method as recited in claim 5, further comprising:
    comparing the first and the second time stamps when the comparing indicates that the received motion signature does not effectively match the motion signature retained in the first device; and
    pairing the first device and the second device when the comparing of the first and the second time stamps indicates that the received motion signature and the motion signature retained in the first device were created concurrently with each other.

7. The method as recited in claim 1 wherein the mechanically associating the first device and the second device comprises:
    holding the first device in a first hand; and
    concurrently holding the second device in a second hand different from the first hand.

8. A portable media device, comprising:
    a processor, wherein the processor causes the portable media device to pair with a target remote device by causing the portable media device to, receive connection packets from each of a plurality of remote devices only one of which is the target remote device, wherein each of the connection packets includes information associated with the corresponding remote device, analyze the received information, identify the target remote device based on the analysis; and pair only with the target remote device; and a motion detector, the motion detector arranged to detect motion of the portable media device, the motion detector converting the detected motion into motion data retained in the memory device, wherein during a shake to pair pairing operation between the portable media player and the target remote device the portable media player and the target remote device are mechanically associated with each other such the both the portable media player and the target remote device undergo correlated movements that the motion detector senses and converts to motion data, the motion data retained in the memory device as a portable media player motion signature.

9. The portable media device as recited in claim 8, wherein the portable media device further comprises:
a wireless interface arranged to transmit and receive wireless signals.

10. The portable media device as recited in claim 8, wherein the portable media device is not wireless capable, the portable media device being electrically connected to a wireless capable external circuit arranged to transmit and receive the wireless signals.

11. The portable media player as recited in claim 10, wherein after the wireless link is established, the portable media player forwards a copy of the portable media player motion signature to the target remote device that the target remote device retains as a target remote device motion signature.

12. The portable media player as recited in claim 11, wherein the portable media player uses the remote device motion signature to identify the target remote device by comparing the received remote device motion signature with the received remote device motion signature.

13. The portable media player as recited in claim 10, wherein during a subsequent pairing, the portable media player receives a remote device motion signature and uses the remote device motion signature to identify the target remote device.

14. The portable media player as recited in claim 13, wherein the comparing indentifies identifies the target remote device when the comparing indicates that the received remote device motion signature essentially matches the motion signature retained in the personal media device.

15. The method as recited in claim 14, wherein the first device is a personal media device (PMD) and wherein the second device is a sport device(SD), the sport device including at least one sensor.

16. The computer readable medium as recited in claim 8, wherein the shared information is a motion signature.

17. Non-transitory computer readable medium for storing computer code executed by a processor in a portable device for pairing with a target remote device, comprising:
computer code for sharing information between a first device and a second device during an initial pairing operation;
at the initial pairing operation the first and second devices are mechanically coupled together such that the mechanically coupled first device and second device experience correlated movements, the computer code reciting:
computer code for recording the movements including associated timing information as motion data; and
computer code for retaining the motion data as an initial motion signature in the first device and the second device;
computer code for wirelessly linking the first and the second devices using at least some of the shared information; and
computer code for after the wireless link has been severed, re-establishing the wireless link between only the first and the second devices using at least some of the shared information at a subsequent pairing operation.

18. A method performed by a personal media device (PMD) to intelligently pair with only a target remote device, the method comprising:
generating motion data at the PMD by:
moving the PMD, while the PMD is mechanically associated with a target remote sport device, such that the PMD and the target remote sport device experience correlated movements,
recording the movements of the PMD, including associated timing information, as PMD motion data,
retaining the PMD motion data as a PMD motion signature in the PMD;
listening for connection packets from a plurality of remote sport devices only one of which is the target remote sport device, wherein each of the connection packets includes motion data;
analyzing the motion data to identify the target remote sport device, wherein analyzing the motion data includes comparing the PMD motion signature against a motion signature for a remote sport device;
pairing only with the target remote sport device.

19. A physical activity monitoring system, comprising:
a portable media device, the portable media device arranged to wirelessly communicate with a first remote physical activity device over an initial wireless link in response to an initial pairing operation, wherein subsequent to the initial pairing and after the initial wireless link has been severed, the portable media device re-establishes a subsequent wireless link only with the first remote physical activity device by broadcasting a request for information, operating on information received in response to the broadcasted information request, the information being received from a plurality of remote physical activity devices only one of which is the initial remote physical activity device, and using the operated on information to broadcast a connection acceptance command that only the first remote physical activity device responds with a connection acknowledgment;
wherein the portable media device is configured to perform an initial paring operation to obtain motion data by,
moving the portable media device while the portable media device is mechanically associated with the initial remote physical activity device, such that the portable media device and the initial remote physical activity device experience correlated movements,
recording the movements of the portable media device, including associated timing information, as portable media device motion data,
retaining the portable media device motion data as a portable media device motion signature in the portable media device;
wherein, while operating on the information received in response to the broadcasted information request, the portable media device is configured to identify the initial remote physical activity device by attempting to match the portable media device motion signature with a corresponding motion signature contained in the received information.

* * * * *